US012786878B2

(12) United States Patent
Duan et al.

(10) Patent No.: US 12,786,878 B2
(45) Date of Patent: Nov. 3, 2026

(54) TECHNIQUES TO ACTIVATE SEMI-PERSISTENT SCHEDULING (SPS) OCCASIONS

(71) Applicant: QUALCOMM Incorporated, San Diego, CA (US)

(72) Inventors: Weimin Duan, San Diego, CA (US); Huilin Xu, Temecula, CA (US); Mostafa Khoshnevisan, San Diego, CA (US); Le Liu, San Jose, CA (US); Kangqi Liu, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 18/596,546

(22) Filed: Mar. 5, 2024

(65) Prior Publication Data

US 2025/0287309 A1 Sep. 11, 2025

(51) Int. Cl.
*H04W 52/02* (2009.01)
*H04W 72/11* (2023.01)
(Continued)

(52) U.S. Cl.
CPC ........ *H04W 52/0235* (2013.01); *H04W 72/11* (2023.01); *H04W 72/1273* (2013.01); *H04W 72/232* (2023.01); *H04W 72/52* (2023.01)

(58) Field of Classification Search
CPC ........... H04W 72/1273; H04W 72/232; H04W 72/52; H04W 72/11; H04W 52/028;
(Continued)

(56) References Cited

U.S. PATENT DOCUMENTS

2022/0394618 A1* 12/2022 Yang ................. H04W 52/0232
2025/0220582 A1* 7/2025 Li ......................... H04W 68/02
(Continued)

FOREIGN PATENT DOCUMENTS

WO WO-2024039180 A1 * 2/2024 ............ H04W 72/23
WO WO-2024234486 A1 11/2024

OTHER PUBLICATIONS

International Search Report and Written Opinion—PCT/US2025/014648—ISA/EPO—Jun. 6, 2025.
(Continued)

*Primary Examiner* — Brian D Nguyen
(74) *Attorney, Agent, or Firm* — QUALCOMM Incorporated

(57) ABSTRACT

Methods, systems, and devices for wireless communications are described. In some examples, a user equipment (UE) may receive, via a first radio, control signaling that indicates a configuration associated with a wake-up signal (WUS) and that also indicates an association between the WUS and a semi-persistent scheduling (SPS) occasion. As such, the UE may monitor, via a second radio, for the WUS in accordance with the control signaling, where the WUS may indicate whether the SPS occasion includes a physical downlink shared channel (PDSCH) transmission. For example, if the WUS indicates that the SPS occasion includes the PDSCH transmission, the UE may perform a first procedure pertaining to monitoring, via the first radio, the SPS occasion. Alternatively, if the WUS indicates that the SPS occasion is empty, the UE may perform a second procedure pertaining to maintaining the first radio in a sleep mode.

30 Claims, 15 Drawing Sheets

(51) Int. Cl.
*H04W 72/1273* (2023.01)
*H04W 72/232* (2023.01)
*H04W 72/52* (2023.01)

(58) Field of Classification Search
CPC . H04W 52/0235; H04W 88/06; H04W 72/23; H04L 41/0806; H04L 43/087
See application file for complete search history.

(56) References Cited

U.S. PATENT DOCUMENTS

| | | | | |
|---|---|---|---|---|
| 2025/0261232 | A1* | 8/2025 | Hui | H04W 72/0446 |
| 2025/0365669 | A1* | 11/2025 | Li | H04W 52/0235 |
| 2026/0052474 | A1* | 2/2026 | Li | H04W 52/0235 |
| 2026/0052475 | A1* | 2/2026 | Cui | H04W 52/0235 |
| 2026/0052599 | A1* | 2/2026 | Lee | H04W 76/28 |

OTHER PUBLICATIONS

Moderator (Qualcomm Incorporated): “Moderator Summary #2 on XR specific power saving techniques”, 3GPP TSG RAN WG1 #110-bis-e, R1-2210338, e-Meeting, Oct. 10-19, 2022, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Oct. 18, 2022, XP052259806, pp. 1-113, the whole document.

Moderator (Qualcomm Incorporated): “Moderator Summary#1 on XR specific power saving techniques”, 3GPP TSG RAN WG1 #110-bis-e, R1-2210337, e-Meeting, Oct. 10-19, 2022, 3rd Generation Partnership Project, Mobile Competence Centre, 650, Route Des Lucioles, F-06921 Sophia-Antipolis Cedex, France, vol. RAN WG1, No. e-Meeting; Oct. 10, 2022-Oct. 19, 2022, Oct. 12, 2022, XP052259805, pp. 1-89, p. 69.

* cited by examiner

TECHNIQUES TO ACTIVATE SEMI-PERSISTENT SCHEDULING (SPS) OCCASIONS

FIELD OF TECHNOLOGY

The following relates to wireless communications, including techniques to activate semi-persistent scheduling (SPS) occasions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques to activate semi-persistent scheduling (SPS) occasions. For example, the described techniques provide for SPS monitoring indications via a wake-up signal (WUS). In some examples, a UE may receive, via a first radio while operating in an active mode, control signaling indicating a configuration for a low-power WUS, where the control signaling may further indicate the WUS is associated with (e.g., contains information for) one or more SPS occasions. For example, the control signaling may indicate that the WUS is associated with a single SPS occasion. Alternatively, the control signaling may indicate that the WUS is associated with multiple SPS occasions. Accordingly, based on the control signaling, the UE may monitor, via a second radio while the first radio is operating in the sleep mode, for the WUS, where the WUS may indicate whether the associated SPS occasions include a physical downlink shared channel (PDSCH). If the WUS indicates that the associated SPS occasions include a PDSCH, the UE may perform a first procedure to wake-up the first radio, monitor the SPS occasions, and receive the PDSCHs. Alternatively, if the WUS indicates that the associated SPS occasions are empty (e.g., do not include a PDSCH transmission), the UE may maintain the first radio in the sleep mode.

A method for wireless communications by a UE is described. The method may include receiving, via a first radio at the UE, control signaling that indicates a configuration associated with a WUS and that also indicates an association between the WUS and a SPS occasion, monitoring, via a second radio at the UE, for the WUS in accordance with the configuration, and performing one of a first procedure or a second procedure based on the monitoring, the first procedure pertaining to monitoring, via the first radio, the SPS occasion, and the second procedure pertaining to maintaining the first radio of the UE in a sleep mode.

A UE for wireless communications is described. The UE may include one or more memories storing processor executable code, and one or more processors coupled with the one or more memories. The one or more processors may individually or collectively be operable to execute the code to cause the UE to receive, via a first radio at the UE, control signaling that indicates a configuration associated with a WUS and that also indicates an association between the WUS and a SPS occasion, monitor, via a second radio at the UE, for the WUS in accordance with the configuration, and perform one of a first procedure or a second procedure based on the monitoring, the first procedure pertaining to monitoring, via the first radio, the SPS occasion, and the second procedure pertaining to maintaining the first radio of the UE in a sleep mode.

Another UE for wireless communications is described. The UE may include means for receiving, via a first radio at the UE, control signaling that indicates a configuration associated with a WUS and that also indicates an association between the WUS and a SPS occasion, means for monitoring, via a second radio at the UE, for the WUS in accordance with the configuration, and means for performing one of a first procedure or a second procedure based on the monitoring, the first procedure pertaining to monitoring, via the first radio, the SPS occasion, and the second procedure pertaining to maintaining the first radio of the UE in a sleep mode.

A non-transitory computer-readable medium storing code for wireless communications is described. The code may include instructions executable by one or more processors to receive, via a first radio at the UE, control signaling that indicates a configuration associated with a WUS and that also indicates an association between the WUS and a SPS occasion, monitor, via a second radio at the UE, for the WUS in accordance with the configuration, and perform one of a first procedure or a second procedure based on the monitoring, the first procedure pertaining to monitoring, via the first radio, the SPS occasion, and the second procedure pertaining to maintaining the first radio of the UE in a sleep mode.

In some examples of the method, UEs, and non-transitory computer-readable medium described herein, performing the first procedure may include operations, features, means, or instructions for waking up the first radio of the UE, monitoring, based on waking up the first radio, the SPS occasion, and receiving, via the first radio, the PDSCH based on the monitoring.

Some examples of the method, UEs, and non-transitory computer-readable medium described herein may further include operations, features, means, or instructions for monitoring, prior to receiving the PDSCH, for downlink control information (DCI) based on the WUS indicating that the SPS occasion includes the PDSCH, the DCI indicating a set of parameters for receiving the PDSCH.

In some examples of the method, UEs, and non-transitory computer-readable medium described herein, the set of parameters include a quantity of resource blocks (RBs) of the SPS occasion, a modulation and coding scheme (MCS) associated with the PDSCH, a set of resources for indicating feedback associated with the PDSCH, or a combination thereof.

Some examples of the method, UEs, and non-transitory computer-readable medium described herein may further include operations, features, means, or instructions for refraining from monitoring for DCI based on the WUS further indicating for the UE to skip monitoring for the DCI, where receiving the PDSCH includes and receiving the PDSCH via the SPS occasion according to a set of parameters indicated in the control signaling.

In some examples of the method, UEs, and non-transitory computer-readable medium described herein, the WUS indicating for the UE to skip monitoring for the DCI may be based on a stability of a channel between the UE and a network entity, a variability of traffic load communicated via the channel, or both.

In some examples of the method, UEs, and non-transitory computer-readable medium described herein, the PDSCH carries data associated with extended reality (XR) applications.

In some examples of the method, UEs, and non-transitory computer-readable medium described herein, the PDSCH may be a retransmission and and the UE monitors for the retransmission or for a DCI that schedules the retransmission based on the WUS indicating that the SPS occasion includes the PDSCH.

In some examples of the method, UEs, and non-transitory computer-readable medium described herein, performing the second procedure may include operations, features, means, or instructions for refraining from waking up the first radio of the UE, where the first radio may be maintained in the sleep mode based on refraining from waking up the first radio.

Some examples of the method, UEs, and non-transitory computer-readable medium described herein may further include operations, features, means, or instructions for refraining from transmitting feedback information associated with the PDSCH based on the WUS indicating that the SPS occasion does not include the PDSCH.

Some examples of the method, UEs, and non-transitory computer-readable medium described herein may further include operations, features, means, or instructions for performing the second procedure based on an absence of the WUS during resources associated with the wake-up signal, where the absence of the WUS during the resources indicates that the SPS occasion does not include a PDSCH.

Some examples of the method, UEs, and non-transitory computer-readable medium described herein may further include operations, features, means, or instructions for performing the first procedure based on an absence of the WUS during resources associated with the wake-up signal, where the absence of the WUS during the resources indicates that the SPS occasion includes a PDSCH.

In some examples of the method, UEs, and non-transitory computer-readable medium described herein, the control signaling further indicates a jitter range associated with the SPS occasion, and monitoring the WUS may be in accordance with the jitter range associated with the SPS occasion.

In some examples of the method, UEs, and non-transitory computer-readable medium described herein, performance of the first procedure or the second procedure may be based on bit values of one or more bits of the WUS.

In some examples of the method, UEs, and non-transitory computer-readable medium described herein, performance of the first procedure or the second procedure may be based on a modulation scheme of the WUS, a data rate of a symbol used to transmit the WUS, a waveform pattern of the WUS, or a combination thereof.

In some examples of the method, UEs, and non-transitory computer-readable medium described herein, a periodicity of the WUS may be based on a periodicity of the SPS occasion.

In some examples of the method, UEs, and non-transitory computer-readable medium described herein, the WUS may be a low-power WUS.

A method for wireless communications by an apparatus is described. The method may include transmitting control signaling that indicates a configuration associated with a WUS and that also indicates an association between the WUS and a SPS occasion and transmitting the WUS in accordance with the configuration, where the WUS indicates to a UE whether the SPS occasion includes a PDSCH.

An apparatus for wireless communications is described. The apparatus may include one or more memories storing processor executable code, and one or more processors coupled with the one or more memories. The one or more processors may individually or collectively be operable to execute the code to cause the apparatus to transmit control signaling that indicates a configuration associated with a WUS and that also indicates an association between the WUS and a SPS occasion and transmit the WUS in accordance with the configuration, where the WUS indicates to a UE whether the SPS occasion includes a PDSCH.

Another apparatus for wireless communications is described. The apparatus may include means for transmitting control signaling that indicates a configuration associated with a WUS and that also indicates an association between the WUS and a SPS occasion and means for transmitting the WUS in accordance with the configuration, where the WUS indicates to a UE whether the SPS occasion includes a PDSCH.

A non-transitory computer-readable medium storing code for wireless communications is described. The code may include instructions executable by one or more processors to transmit control signaling that indicates a configuration associated with a WUS and that also indicates an association between the WUS and a SPS occasion and transmit the WUS in accordance with the configuration, where the WUS indicates to a UE whether the SPS occasion includes a PDSCH.

In some examples of the method, apparatus, and non-transitory computer-readable medium described herein, the WUS indicates that the SPS occasion includes the PDSCH and the method, apparatuses, and non-transitory computer-readable medium may include further operations, features, means, or instructions for transmitting, via the SPS occasion, the PDSCH.

Some examples of the method, apparatus, and non-transitory computer-readable medium described herein may further include operations, features, means, or instructions for transmitting, prior to transmitting the PDSCH, DCI that indicates a set of parameters associated with receiving the PDSCH.

In some examples of the method, apparatus, and non-transitory computer-readable medium described herein, the set of parameters include a quantity of RBs of the SPS occasion, a MCS associated with the PDSCH, a set of resources for indicating feedback associated with the PDSCH, or a combination thereof.

Some examples of the method, apparatus, and non-transitory computer-readable medium described herein may further include operations, features, means, or instructions for refraining from transmitting DCI based on the WUS further indicating for the UE to skip monitoring for the DCI.

In some examples of the method, apparatus, and non-transitory computer-readable medium described herein, the WUS indicates for the UE to skip monitoring for the DCI may be based on a stability of a channel between the UE and the network entity, a variability of traffic load communicated via the channel, or both.

In some examples of the method, apparatus, and non-transitory computer-readable medium described herein, the PDSCH carries data associated with XR applications.

In some examples of the method, apparatus, and non-transitory computer-readable medium described herein, the WUS indicates that the SPS occasion does not include the PDSCH and the method, apparatuses, and non-transitory computer-readable medium may include further operations, features, means, or instructions for refraining from transmitting the PDSCH via the SPS occasion.

Some examples of the method, apparatus, and non-transitory computer-readable medium described herein may further include operations, features, means, or instructions for transmitting the WUS according to a periodicity that may be based on a periodicity of the SPS occasion.

In some examples of the method, apparatus, and non-transitory computer-readable medium described herein, the control signaling further indicates a jitter range associated with the SPS occasion, and transmitting the WUS may be in accordance with the jitter range associated with the SPS occasion.

In some examples of the method, apparatus, and non-transitory computer-readable medium described herein, bit values of one or more bits of the WUS indicate whether the SPS occasion includes the PDSCH.

In some examples of the method, apparatus, and non-transitory computer-readable medium described herein, a modulation scheme of the WUS, a data rate of a symbol used to transmit the WUS, a waveform pattern of the WUS, or a combination thereof, indicate whether the SPS occasion includes the PDSCH.

In some examples of the method, apparatus, and non-transitory computer-readable medium described herein, the WUS may be a low-power WUS.

DETAILED DESCRIPTION

Figure 1:
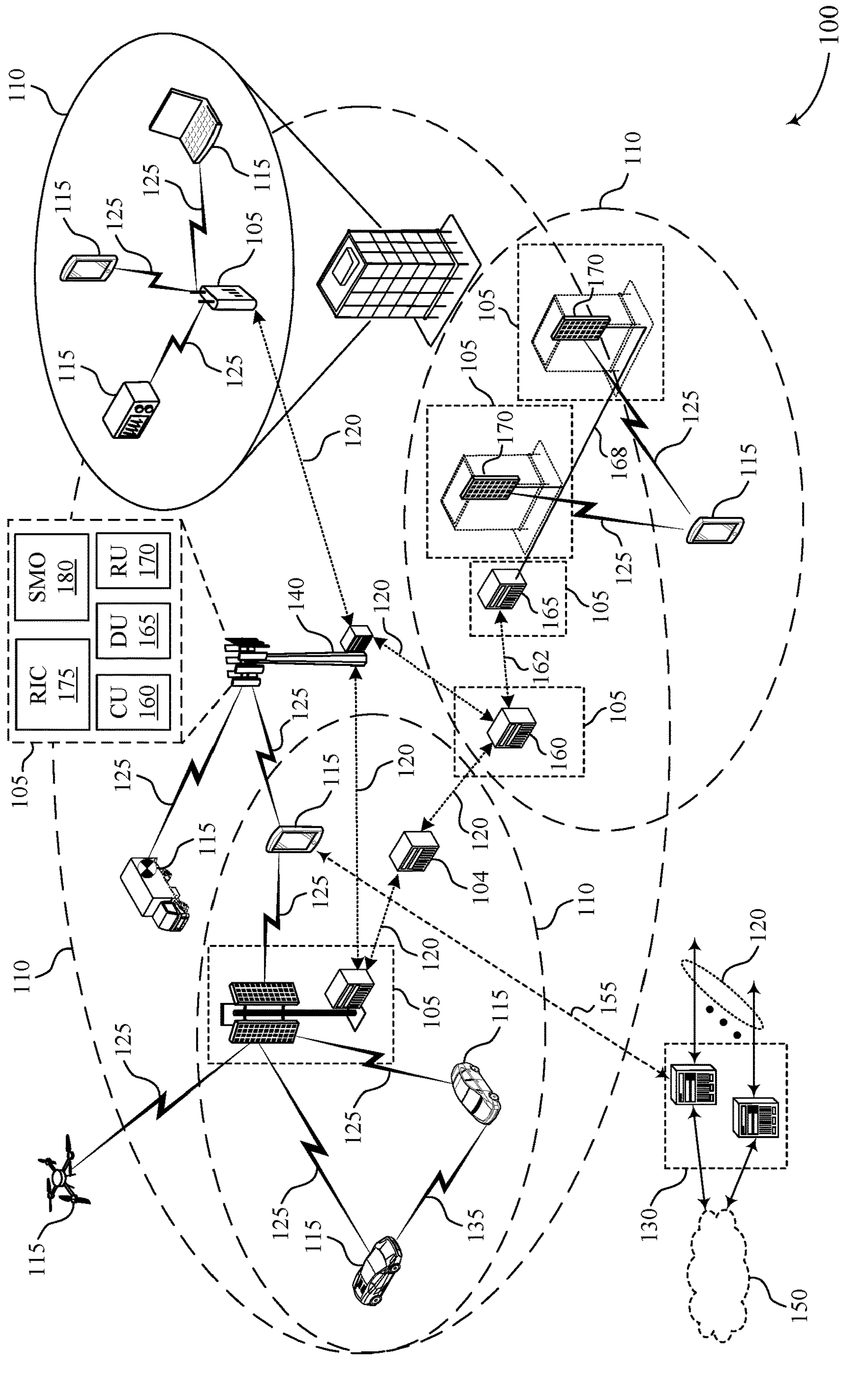
FIG. 1 shows an example of a wireless communications system that supports techniques to activate semi-persistent scheduling (SPS) occasions in accordance with one or more aspects of the present disclosure.

In some wireless communications system, a network entity may communicate with a user equipment (UE) via semi-persistent scheduling (SPS). For example, a network entity may transmit, via radio resource control (RRC) signaling, a configuration indicating periodic SPS occasions (e.g., periodic time and frequency resources). The network entity may transmit, to the UE, downlink control information activating the SPS configuration, such that the UE may have an indication of when to begin monitoring the SPS occasions. By using the SPS occasions, the network entity may transmit a physical downlink shared channel (PDSCH) to the UE without first transmitting multiple scheduling DCIs.

In some cases, a main radio of the UE may enter a sleep mode (e.g., an inactive mode), where the UE may power off the main radio and use a low-power wake-up radio (LP-WUR) to monitor for a wake-up signal (WUS). In such cases, if the SPS configuration is activated, then the UE may wake-up the main radio prior to each SPS occasion, monitor the SPS occasion, and receive the PDSCH transmission. In some cases, however, one of the multiple of the periodic SPS occasions may be empty (e.g., not include a PDSCH transmission), which may cause the UE to unnecessarily wake-up the main radio and monitor the SPS occasion, thereby reducing power savings at the UE.

The techniques described herein may enable the network entity to indicate, via the WUS, whether one or more of the periodic SPS occasions will be empty (e.g., whether one or more of the multiple SPS occasions include a PDSCH transmission), thereby reducing the quantity of times at which the UE wakes up to monitor an empty SPS occasion. For example, the UE may receive, via the main radio, control signaling indicating a configuration associated with the WUS (e.g., one or more time and frequency resources for the WUS, waveform parameters, sequence parameters, or a combination thereof) and also indicating an association between the WUS and a SPS occasion (e.g., that the WUS contains information associated with the SPS occasion). Accordingly, the UE may monitor, via the LP-WUR and while the main radio is operating in the sleep mode, for the WUS, where the WUS may indicate whether the associated SPS occasion includes a PDSCH transmission. For example, the WUS may indicate that the SPS occasion does include a PDSCH transmission and, as such, the UE may wake-up the main radio and monitor the SPS occasion for the PDSCH transmission. Alternatively, the WUS may indicate that the SPS occasion does not include a PDSCH transmission (e.g., is empty) and, as such, the UE may not wake-up the main radio. In this way, the network entity may indicate whether the SPS occasion includes a PDSCH transmission via the WUS.

Aspects of the disclosure are initially described in the context of wireless communications systems. Aspects are further described in the context of process flow. Aspects of the disclosure are further illustrated by and described with reference to apparatus diagrams, system diagrams, and flowcharts that relate to techniques to activate SPS occasions.

FIG. 1 shows an example of a wireless communications system 100 that supports techniques to activate SPS occasions in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) (e.g., including acknowledgements (ACKs) and negative acknowledgements (NACKs)) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications system, the network entity 105 may communicate with the UE 115 via SPS. For example, a network entity 105 may transmit, via RRC signaling, a configuration indicating periodic SPS occasions (e.g., periodic time and frequency resources). The network entity 105 may transmit, to the UE 115, downlink control information activating the SPS configuration, such that the UE 115 may have an indication of when to begin monitoring the SPS occasions. By using the SPS occasions, the network entity 105 may transmit PDSCH to the UE 115 without first transmitting multiple scheduling DCIs.

In some cases, a main radio of the UE 115 may enter a sleep mode (e.g., an inactive mode), where the UE 115 may power off the main radio and use a LP-WUR to monitor for a WUS. In such cases, if the SPS configuration is activated, then the UE 115 may wake-up the main radio prior to each SPS occasion, monitor the SPS occasion, and receive the PDSCH transmission. In some cases, however, one of the multiple of the periodic SPS occasions may be empty (e.g., not include a PDSCH transmission), which may cause the UE 115 to unnecessarily wake-up the main radio and monitor the SPS occasion, thereby reducing power savings at the UE 115.

The techniques described herein may enable the network entity 105 to indicate, via the WUS, whether one or more of the periodic SPS occasions will be empty (e.g., whether one or more of the multiple SPS occasions include a PDSCH transmission), thereby reducing the quantity of times at which the UE 115 wakes up to monitor an empty SPS occasion. For example, the UE 115 may receive, via the main radio, control signaling indicating a configuration associated the WUS and also indicating an association between the WUS and a SPS occasion (e.g., that the WUS contains information associated with the SPS occasion). Accordingly, the UE 115 may monitor, via the LP-WUR and while the main radio is operating in the sleep mode, for the WUS, where the WUS may indicate whether the associated SPS occasion includes a PDSCH transmission. For example, the WUS may indicate that the SPS occasion does include a PDSCH transmission and, as such, the UE 115 may wake-up the main radio and monitor the SPS occasion for the PDSCH transmission. Alternatively, the WUS may indicate that the SPS occasion does not include a PDSCH transmission (e.g., is empty) and, as such, the UE 115 may not wake-up the main radio. In this way, the network entity 105 may indicate whether the SPS occasion includes a PDSCH transmission via the WUS.

Figure 2:
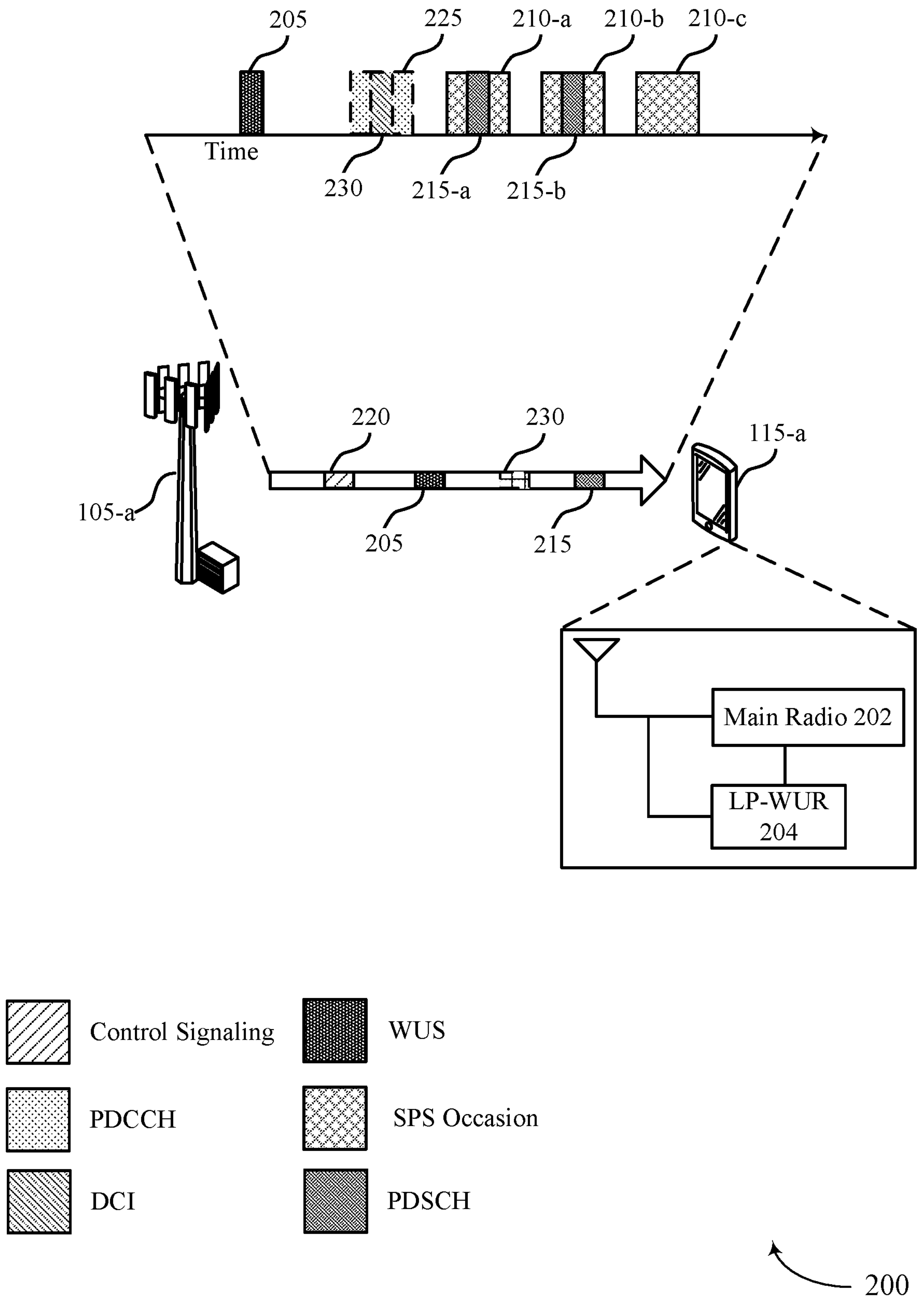
FIG. 2 shows an example of a wireless communications system that supports techniques to activate SPS occasions in accordance with one or more aspects of the present disclosure.

FIG. 2 shows an example of a wireless communications system 200 that supports techniques to activate SPS occasions in accordance with one or more aspects of the present disclosure. Aspects of the wireless communications system 200 may implement, or be implemented by, aspects of wireless communications system 100 with reference to FIG. 1. For example, the wireless communications system 200 may include a network entity 105-*a* and a UE 115-*a*, which may be examples of the network entity 105 and the UEs 115 as described herein with reference to FIG. 1. The techniques described in the context of the wireless communications system 200 may enable the network entity 105-*a* to indicate, via a WUS 205, whether one or more SPS occasions 210 include PDSCHs 215.

In some cases, the UE 115-*a* may include one or more radios. For example, the UE 115-*a* may utilize a main radio 202 during active communications, for example, while the UE 115-*a* is operating in an active or connected mode. The UE 115-*a* also may include a LP-WUR 204, which may be a companion receiver, to the main radio 202, where the LP-WUR 204 may draw a relatively lower power than the main radio 202 and be used by the UE 115-*a* to monitor for a WUS 205 while the main radio 202 is operating in a deep sleep state. While the main radio 202 is operating in the sleep mode, the UE 115-*a*, via the LP-WUR 204, may monitor for the WUS 205, such that the UE 115-*a* may experience power savings during such operations. Accordingly, in response to receiving the WUS 205, the LP-WUR 204 may wake-up the main radio 202 (e.g., indicate to the main radio 202 to power up) to receive data communications from the network entity 105-*a*. In such examples, the LP-WUR may consume a relatively lower power than the main radio 202 by design, for example, the LP-WUR may be powered separately than the main radio 202, include relatively fewer components that consume power than the main radio 202, or both. By using the LP-WUR 204 while the main radio 202 is in the sleep mode, the UE 115-*a* may reduce the total power consumption by avoiding unnecessary wake-ups of the main radio 202, which may increase power consumption at the UE 115-*a*, and also reduce latency by monitoring WUSs 205.

In some examples, to facilitate downlink communication with the UE 115-*a*, the network entity 105-*a* may perform semi-persistent scheduling, where the network entity 105-*a* may configure one or more SPS occasions 210, which may be periodic resources allocated for downlink transmissions to the UE 115-*a* (e.g., and retransmissions may be sent via dynamic grants). For example, the network entity 105-*a* may transmit control signaling 220 (e.g., RRC signaling) that includes an SPS configuration, where the SPS configuration indicates a periodicity of the SPS occasions 210, a quantity of RBs associated with the SPS occasions 210, a modulation and coding scheme (MCS) associated with the SPS occasion 210, physical uplink control channel (PUCCH) resources for HARQ-ACK feedback associated with the SPS occasions 210, or a combination thereof. That is, the network entity 105-*a* may indicate, via the control signaling 220, the same periodicity and parameters for each SPS occasion 210 in the SPS configuration.

In such examples, the network entity 105-*a* may activate the SPS configuration indicated by the control signaling 220 via downlink control information (DCI) 230 included in a physical downlink control channel (PDCCH) 225. In such examples, the DCI 230 may also re-indicate, or update, the SPS configuration, for example, by indicating the time-frequency resources and aforementioned parameters associated with the SPS occasions 210 (in a similar way as dynamic scheduling). Based on receiving the control signaling 220 indicating the SPS configuration and the DCI 230 activating the SPS configuration, the UE 115-*a* may monitor, via the main radio 202, each SPS occasion 210 to receive PDSCHs 215.

In some cases, however, one of the configured SPS occasions 210 may not carry a PDSCH 215. That is, the network entity 105-*a* may transmit aperiodic downlink data (e.g., aperiodic PDSCH transmissions) using the SPS occasions 210, resulting in some SPS occasions 210 being empty (e.g., not carrying a PDSCH 215). For example, the network entity 105-*a* may transmit a PDSCH 215-*a* via the SPS occasion 210-*a* and transmit a PDSCH 215-*b* of the SPS occasion 210-*b*, but refrain from transmitting downlink data via the SPS occasion 210-*c*, resulting in the SPS occasion 210-*c*. Such aperiodic downlink transmissions may occur during extended reality (XR) communications, where the periodicity of XR application data may not match with the periodicity of the SPS occasions 210, where the arrival times of the XR application data may vary due to jitter (e.g., latency) in the communication flow between the XR server and the UE 115-*a*, or both.

Such empty SPS occasions 210 may lead to a decrease in power savings at the UE 115-*a*. For example, the UE 115-*a* may receive the WUS 205 indicating for the UE 115-*a* to wake-up the main radio 202 and monitor for the DCI 230 activating an SPS configuration. However, if one or more of the SPS occasions 210 are empty (e.g., do not include a PDSCH 215), the UE 115-*a* may unnecessarily wake-up the main radio 202 and monitor the empty SPS occasion 210-*c*, thereby reducing power savings at the UE 115-*a*. Thus, techniques may be desired to reduce the quantity of times the UE 115-*a* wakes-up the main radio 202 to monitor empty SPS occasions 210.

Further, in some cases, activating the SPS configuration via the DCI 230 may increase the overhead between the UE 115-*a* and the network entity 105-*a*. For example, if the channel conditions between the UE 115-*a* and the network entity 105-*a* remain static (e.g., do not change), the network entity 105-*a* may unnecessarily update the SPS configuration via the DCI 230 (e.g., update the quantity of RBs of the SPS occasions 210, update the MCS of the SPS occasions 210, update the PUCCH resources associated with the SPS occasions 210). That is, the functionality of scheduling and activating the SPS configuration via the DCI 230 of the PDCCH 225 may be unnecessary under static channel conditions. Thus, techniques may be desired to reduce the overhead between the UE 115-*a* and the network entity 105-*a* due to transmitting the DCI 230 activating the SPS configuration.

The techniques described herein may enable the network entity 105-*a* to perform SPS activation via the WUS 205, thereby reducing the overhead between the UE 115-*a* and the network entity 105-*a*, and also enable the network entity 105-*a* to indicate, via the WUS 205, whether one or more SPS occasions 210 include PDSCHs 215 (e.g., whether the SPS occasions 210 are empty), thereby increasing power savings at the UE 115-*a*. For example, if the traffic (e.g., data communication) between the UE 115-*a* and the network entity 105-*a* is relatively low (e.g., light) or if the traffic between the UE 115-*a* and the network entity 105-*a* includes aperiodic data, such as XR communications, the UE 115-*a* may skip monitoring one or more SPS occasions 210 that do not carry a PDSCH 215, skip monitoring the DCI 230 that activates the one or more SPS occasions 210 that do not carry a PDSCH 215, or both, in response to receiving an indication via the WUS 205, thereby saving power at the UE 115-*a*.

In some examples, the network entity 105-*a* may configure one or more multiple sets of WUSs 205 to be associated with (e.g., be received prior to and contain information for) the SPS occasions 210. For example, the network entity 105-*a* may transmit, via the control signaling 220 and in addition to the SPS configuration, a configuration associated with the WUS 205. In such examples, the network entity 105-*a* may indicate, via the configuration, time and frequency resources for the WUS 205, indicate an association between the WUS 205 and the SPS occasions 210, indicate waveform parameters associated with the WUS 205, indicate sequence parameters associated with the WUS 205, or a combination thereof.

In such examples, the network entity 105-*a* may set the periodicity of the WUS 205 based on the periodicity indicated in the SPS configuration for the SPS occasions 210, for example, by setting the periodicity of the WUS 205 to be multiple times that of the periodicity indicated by the SPS configuration for the SPS occasions 210. Similarly, the network entity 105-*a* may set the time offset of the WUS 205 based on the SPS configuration for the SPS occasions, for example, by setting the time offset of the WUS 205 relative to the starting slot of the SPS occasion 210-*a* (e.g., first SPS occasion 210 of the SPS configuration).

As an illustrative example, the network entity 105-*a* may indicate the configuration for the WUS 205 and also indicate that the WUS 205 includes information associated with each SPS occasion 210 (e.g., the SPS occasion 210-*a*, the SPS occasion 210-*b*, the SPS occasion 210-*c*) of an SPS configuration. Alternatively, the network entity 105-*a* may indicate a configuration for a first WUS 205 and indicate that the first WUS 205 includes information for the SPS occasion 210-*a*, indicate a configuration for a second WUS 205 and indicate that the second WUS 205 includes information for the SPS occasion 210-*b* and the SPS occasion 210-*c*. In some other examples, the network entity 105-*a* may configure a respective WUS 205 (e.g., transmit respective configurations via the control signaling 220) for each SPS occasion 210. In such examples, the network entity 105-*a* may set the periodicity and time offset of the WUS 205 to be based on those of the SPS configuration of the SPS occasions 210.

Accordingly, while the main radio 202 is operating in the sleep mode, the UE 115-*a* may monitor, using the LP-WUR 204, for the WUS 205 according to the configuration indicated via the control signaling 220, where the WUS 205 may provide an indication from the network entity 105-*a* as to whether one or more SPS occasions 210 (e.g., whether the group of SPS occasions 210 or a single SPS occasion 210) includes PDSCH 215. As such, if the WUS 205 indicates that the SPS occasions 210 are empty (e.g., do not include a PDSCH 215), the UE 115-*a* may refrain from waking up the main radio 202 and maintain the main radio 202 in the sleep mode, thereby refraining from using the main radio 202 to monitor for the DCI 230 and empty SPS occasions 210. Alternatively, if the WUS 205 indicates that one or more of the SPS occasions are not empty include a PDSCH 215, the UE 115-*a* may wake-up the main radio 202 to monitor for the DCI 230, receive the PDSCH 215, and decode the PDSCH 215.

As an illustrative example, the network entity 105-*a* may indicate, via the control signaling 220, that the WUS 205 is associated with the SPS occasion 210-*a*, the SPS occasion 210-*b*, and the SPS occasion 210-*c*. Accordingly, the UE 115-*a* may receive, via the LP-WUR 204, the WUS 205, where the WUS 205 may indicate that the SPS occasion 210-*a* includes the PDSCH 215-*a*, indicate that the SPS occasion 210-*b* includes the PDSCH 215-*b*, and indicate that the SPS occasion 210-*c* does not include a PDSCH 215 (e.g., is empty). Based on the WUS 205, the UE 115-*a* may wake-up the main radio 202, monitor for the PDCCH for the DCI 230 activating the SPS configuration associated with the SPS occasions 210, monitor the SPS occasion 210-*a* for the PDSCH 215-*a* and the SPS occasion 210-*b* for the PDSCH 215-*b*, and refrain from monitoring the SPS occasion 210-*c*.

In some examples, if the WUS 205 indicates that the one or more SPS occasions 210 are not empty (e.g., include a PDSCH 215), the network entity 105-*a* may further indicate, via the WUS 205, whether the UE 115-*a* is to wake-up the main radio 202 and monitor for the DCI 230. That is, because the network entity 105-*a* indicates that the one or more SPS occasions 210 include a PDSCH 215 via the WUS 205, the UE 115-*a* may refrain from receiving the activation information via the DCI 230, and accordingly, skip monitoring for the DCI 230 in order to further save power.

For example, if the channel between the UE 115-*a* and the network entity 105-*a* is stable (e.g., static, not changing) and the traffic load is static (e.g., consistent, not variable), the network entity 105-*a* may refrain from dynamically updating the parameters of the SPS occasions 210 (e.g., quantity of RBs for each SPS occasion 210, MCS associated with each SPS occasion, PUCCH resources for HARQ-ACK feedback associated with each SPS occasion 210). Accordingly, the network entity 105-*a* may transmit the WUS 205 to further indicate that the UE 115-*a* is to skip monitoring the DCI 230 and directly monitor the SPS occasions 210 to receive and decode the PDSCHs 215 using the previous scheduling information (e.g., SPS configuration indicated via the control signaling 220 or previous DCI 230), which may further save power at the UE 115-*a*.

As an illustrative example, the network entity 105-*a* may indicate, via the control signaling 220, that the WUS 205 is associated with the SPS occasion 210-*a*, the SPS occasion

210-*b*, and the SPS occasion 210-*c*. Accordingly, the UE 115-*a* may receive, via the LP-WUR 204, the WUS 205, where the WUS 205 may indicate that the SPS occasion 210-*a* includes the PDSCH 215-*a*, indicate that the SPS occasion 210-*b* includes the PDSCH 215-*b*, and indicate that the SPS occasion 210-*c* does not include a PDSCH 215 (e.g., is empty). The WUS 205 may further indicate to skip monitoring the PDCCH for the DCI 230. Based on the WUS 205, the UE 115-*a* may wake-up the main radio 202, refrain from monitoring the PDCCH for the DCI 230, monitor the SPS occasion 210-*a* for the PDSCH 215-*a* and the SPS occasion 210-*b* for the PDSCH 215-*b*, and refrain from monitoring the SPS occasion 210-*c*.

In some examples, if the UE 115-*a* does not detect the WUS 205 (e.g., does not receive the WUS 205), the UE 115-*a* may refrain from waking up the main radio 202 and skip monitoring the SPS occasions 210. For example, the network entity 105-*a* may indicate that each of the SPS occasions 210 do not include a PDSCH 215 (e.g., are empty) based on not transmitting the WUS 205. Accordingly, the UE 115-*a* may not receive the WUS 205 and skip monitoring the SPS occasions. Alternatively, if the UE 115-*a* does not detect the WUS 205, the UE 115-*a* may wake-up the main radio 202, monitor the SPS occasions 210, and receive the PDSCHs 215. For example, if the WUS 205 is not transmitted from the network entity 105-*a*, the UE 115-*a* may determine that the PDSCHs 215 (e.g., downlink data) is periodic and present in the SPS occasions 210. Accordingly, the UE 115-*a* may wakeup the main radio 202, monitor the SPS occasions 210, and receive the PDSCHs 215 without first monitoring for the WUS 205.

The UE 115-*a* may determine whether the SPS occasions 210 includes a PDSCH 215 according to one or more bits of the WUS 205, according to a waveform of the WUS 205, according to a data rate of the WUS 205, or a combination thereof. In some examples, the WUS 205 may include one or more bits indicating whether the SPS occasions 210 include a PDSCH 215, where such bits may be the least significant bits (LSBs) of the WUS 205, while legacy information for wake-up procedures may be the most significant bits (MSBs) of the WUS 205, or vice versa. As an illustrative example, the WUS 205 may include three bits (e.g., three LSBs), where a first of the three bits may correspond to the SPS occasion 210-*a*, a second of the three bits may correspond to the SPS occasion 210-*b*, and a third of the three bits may correspond to the SPS occasion 210-*c*. Accordingly, the UE 115-*a* may determine whether each of the SPS occasions 210 include a PDSCH 215 based on the bit values of the corresponding bits (e.g., a bit value of '1' indicates not empty, a bit value of '0' indicates empty, or vice versa). In this way, the network entity 105-*a* may indicate whether the SPS occasions are empty according to bits added to the WUS 205.

In some other examples, the network entity 105-*a* may transmit the WUS 205 according to one or more data rates (e.g., symbol rates) to indicate whether the SPS occasions 210 include a PDSCH 215. For example, several data rates (e.g., symbol rates) may be defined, such as a default data rate, a first data rate, a second data rate, a third data rate, and so on, where each data rate may correspond to a respective WUS configuration. Each WUS configuration may provide an indication as to which SPS occasion 210 is empty or not. Accordingly, if the WUS 205 is transmitted according to the default data rate (e.g., corresponding to the default WUS configuration), the UE 115-*a* may determine that each of the SPS occasions 210 include a PDSCH 215 or do not include a PDSCH 215. As such, if the UE 115-*a* does not detect a WUS 205 with the default data rate, the UE 115-*a* may have an indication that each status (e.g., whether empty or not) of the SPS occasion 210 is different. For example, if the UE 115-*a* detects that the WUS 205 has a non-default data rate, the UE 115-*a* may identify the associated non-default WUS configuration, which may indicate whether a specific SPS occasion 210 is empty or not.

In some other examples, the network entity 105-*a* may transmit the WUS 205 with a hybrid waveform (e.g., a first portion of the waveform is different from a second portion of the waveform), such as an on-off keying (OOK) and frequency modulated continuous wave (FMCW) waveform, a frequency shift keying (FSK) and FMCW waveform, an OOK waveform with an FMCW slope, or an FSK waveform with an FMCW slope. To produce such waveforms, the network entity 105-*a* may modulate the WUS 205 according to a combination of MCSs (e.g., to produce the OOK FMCW waveform, the network entity 105-*a* may apply an OOK MCS and FMCW MCS to transmit the WUS 205). Accordingly, the UE 115-*a* may determine whether one or more SPS occasions 210 include a PDSCH 215 based on the hybrid waveform of the WUS 205. For example, if the UE 115-*a* detects a first waveform (e.g., a default waveform), then the UE 115-*a* may determine that each of the SPS occasions 210 include a PDSCH 215 or do not include a PDSCH 215. Alternatively, if the UE 115-*a* does not detect a WUS 205 (e.g., a default waveform), the UE 115-*a* may combine the first waveform with a second waveform to form the hybrid waveform and detect whether a specific SPS occasion 210 is empty or not based on the hybrid waveform. In such examples, if the UE 115-*a* does not detect a defined waveform for the WUS 205, the UE 115-*a* may refrain from waking up the main radio 202 and skip monitoring the SPS occasions or wake-up the main radio 202 and monitor the SPS occasions.

As described herein, the network entity 105-*a* may use the SPS occasions 210 to transmit XR traffic, however, the jitter associated with such XR traffic (e.g., PDSCHs 215 carrying XR data) may result in one or more of the SPS occasions 210 being empty. Accordingly, the network entity 105-*a* may configure one or more WUSs 205 around the SPS occasions 210 carrying the XR traffic, where the WUS 205 may enable high granularity wake-up of the main radio 202 to achieve low latency, while maintain low power consumption with LP-WUR 204. As such, the network entity 105-*a* may use the WUS 205 to indicate whether one or more SPS occasions 210 carrying XR traffic or not (e.g., whether the SPS occasions are empty). Further, to reduce power consumption at the UE 115-*a*, the network entity 105-*a* may transmit, via the control signaling 220, jitter range information (e.g., average arrival time of XR traffic relative to a delivery deadline, a time period prior to the average arrival time, a time period after the average arrival time) associated with the XR traffic, such that the UE 115-*a* may monitor for WUSs 205 that are within the jitter range of the SPS occasions 210.

In some examples, to reduce unnecessary HARQ-ACK transmissions from the UE 115-*a*, the UE 115-*a* may refrain from transmitting HARQ information based on the WUS 205. For example, if the WUS 205 indicates that the SPS occasions 210 do not include a PDSCH 215, then the UE 115-*a* may refrain from transmitting a NACK for the associated SPS occasions, at least if the HARQ-ACK information is the singular uplink transmission (e.g., only uplink transmission). Otherwise, the UE 115-*a* may utilize the PUCCH resources in the SPS configuration for HARQ-ACK transmissions when the SPS occasions 210 include a PDSCH 215.

In some other examples, the UE 115-*a* may determine whether to monitor for a retransmission of a PDSCH 215 based on the WUS 205. For example, the UE 115-*a* may determine whether to monitor for a retransmission of a PDSCH 215 original scheduled in the SPS occasions 210 based on whether the WUS 205 indicates the presence or absence of the PDSCH in the SPS occasions 210. If the WUS 205 indicates that the SPS occasions 210 are empty, then the UE 115-*a* may refrain from monitoring for retransmissions. Otherwise, if the UE 115-*a* receives an indication that the SPS occasions 210 include a PDSCH 215, the UE 115-*a* may also receive an indication in the WUS 205 as to whether the UE 115-*a* is to monitor for retransmissions of the PDSCH 215. For example, the WUS 205 may indicate for the UE 115-*a* to receive the PDSCH retransmission, indicate for the UE 115-*a* to receive the DCI 230 scheduling the PDSCH retransmission, or both.

Figure 3:
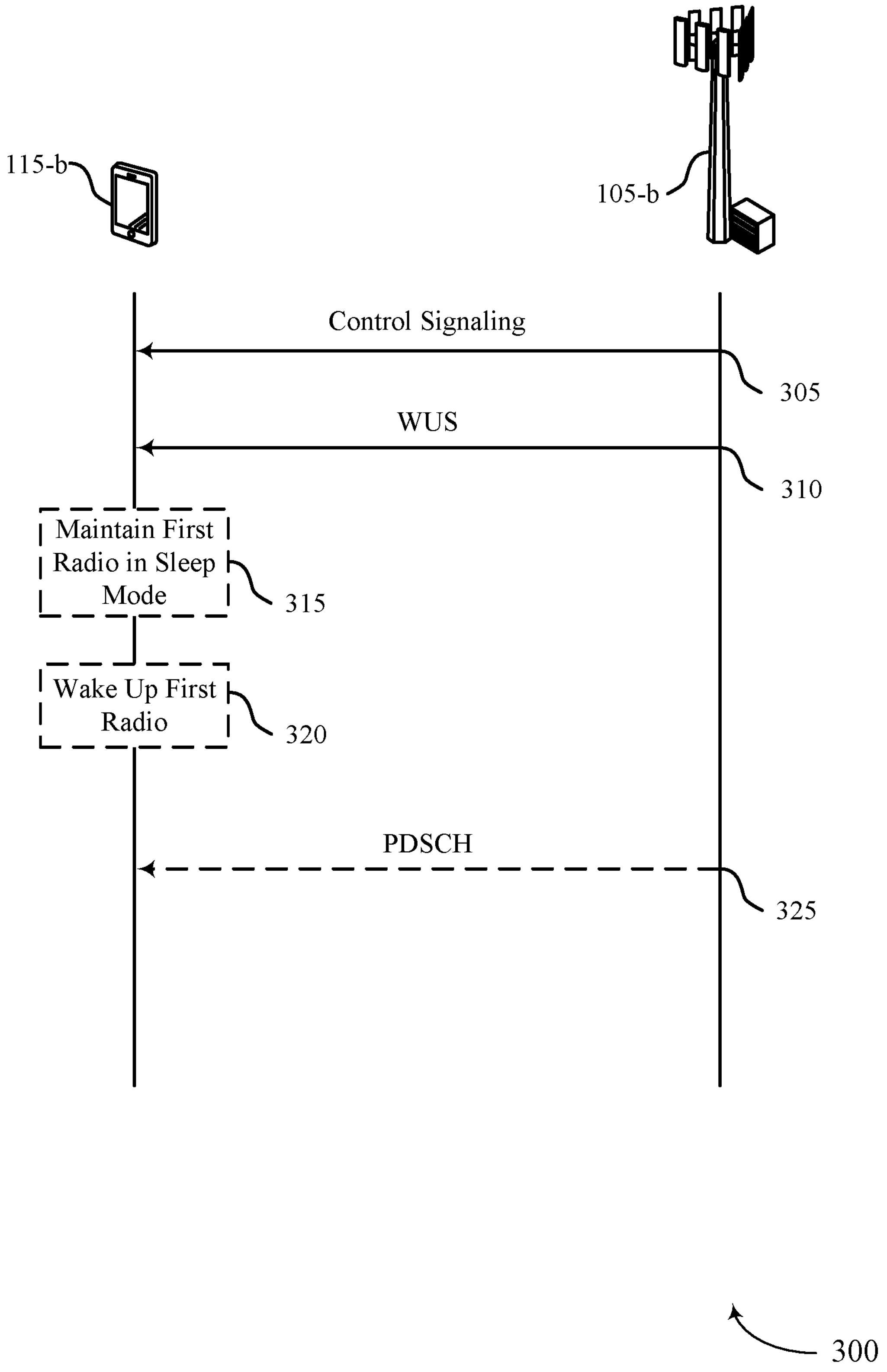
FIG. 3 shows an example of a process flow that supports techniques to activate SPS occasions in accordance with one or more aspects of the present disclosure.

FIG. 3 shows an example of a process flow 300 that supports techniques to activate SPS occasions in accordance with one or more aspects of the present disclosure. Aspects of the process flow 300 may implement, or be implemented by, aspects of wireless communications system 100 and the wireless communications system 200, as described herein with reference to FIGS. 1 and 2. For example, the process flow 300 may include a network entity 105-*b* and a UE 115-*b*, which may be examples of the network entity 105 and the UEs 115 as described herein with reference to FIGS. 1 and 2. The techniques described in the context of the process flow 300 may enable the network entity 105-*b* to indicate, via a WUS, whether one or more SPS occasions include PDSCH transmissions.

At 305, the UE 115-*b* may receive, via a first radio (e.g., the main radio 202), control signaling (e.g., the control signaling 220) indicating a configuration associated with a WUS (e.g., the WUS 205) and indicating an association between the WUS and a SPS occasion (e.g., SPS occasion 210). For example, the UE 115-*b* may receive the control signaling in accordance with the techniques described herein with reference to FIG. 2. In such examples, the configuration associated with the WUS may include time and frequency resources associated with the WUS, waveform parameters associated with the WUS (e.g., waveform type, MCS, data rate, or a combination thereof), sequence parameters associated with the WUS (e.g., a quantity of bits associated with the WUS), a data rate associated with the WUS, or any combination thereof.

At 310, the UE 115-*b* may monitor for, and receive, via a second radio (e.g., LP-WUR 204), the WUS, where the WUS indicates whether the SPS occasion includes a PDSCH (e.g., PDSCH 215). The network entity 105-*b* may indicate, via the WUS, whether the SPS occasion includes a PDSCH via one or more bits, via a data rate of a symbol of the WUS, a waveform of the WUS, or a combination thereof, as described herein with reference to FIG. 2. Accordingly, the UE 115-*b* may perform one of a first procedure (e.g., wakeup the main radio and receive PDSCH) or a second procedure (e.g., maintain the main radio in the sleep mode) based on the indication in the WUS.

At 315, if the WUS indicates that the SPS occasion does not include a PDSCH (e.g., is empty), the UE 115-*b* may maintain the main radio in the sleep mode and refrain from waking-up the first radio. Alternatively, at 320, if the WUS indicates that the SPS occasion does include a PDSCH, the UE 115-*b* may wake-up the first radio. At 325, the UE 115-*b* may monitor the SPS occasion and receive the PDSCH. In some examples, prior to monitoring for the SPS occasion, the UE 115-*b* may monitor a PDCCH for a DCI (e.g., DCI 230) that activates the SPS occasion, where receiving the PDSCH is based on receiving the DCI. Alternatively, the WUS may indicate for the UE 115-*b* to skip monitoring the DCI, and instead monitor the SPS occasion directly to receive the PDSCH.

Figure 4:
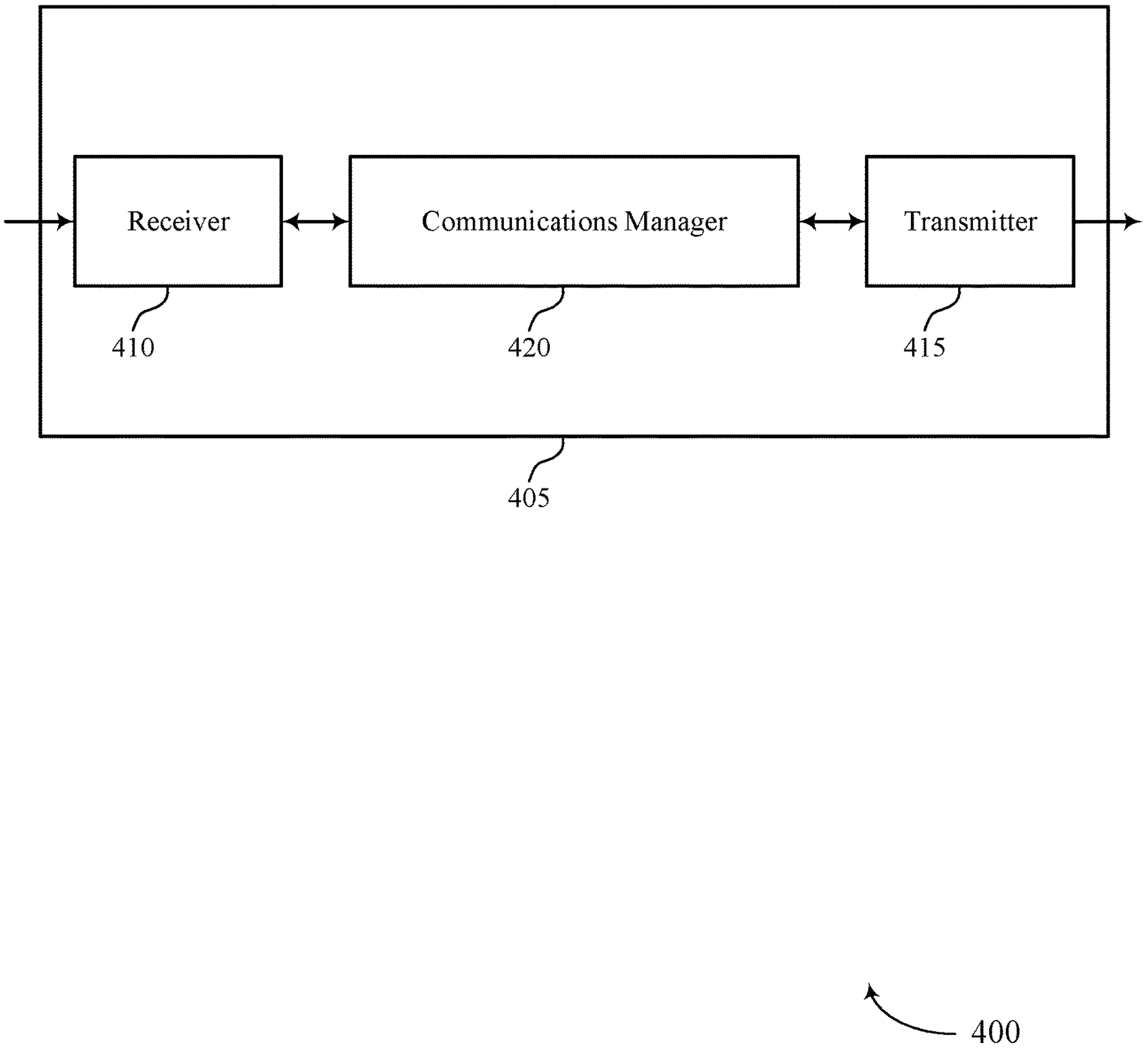
FIGS. 4 and 5 show block diagrams of devices that support techniques to activate SPS occasions in accordance with one or more aspects of the present disclosure.

FIG. 4 shows a block diagram 400 of a device 405 that supports techniques to activate SPS occasions in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques to activate SPS occasions). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques to activate SPS occasions). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations or components thereof may be examples of means for performing various aspects of techniques to activate SPS occasions as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving, via a first radio at the UE, control signaling that indicates a configuration associated with a WUS and that also indicates an association between the WUS and a SPS occasion. The communications manager 420 is capable of, configured to, or operable to support a means for monitoring, via a second radio at the UE, for the WUS in accordance with the configuration. The communications manager 420 is capable of, configured to, or operable to support a means for performing one of a first procedure or a second procedure based on the monitoring, the first procedure pertaining to monitoring, via the first radio, the SPS occasion, and the second procedure pertaining to maintaining the first radio of the UE in a sleep mode.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for indicating empty SPS occasions via a WUS, which may provide for reduced processing, reduced power consumption, and a more efficient utilization of communication resources.

Figure 5:
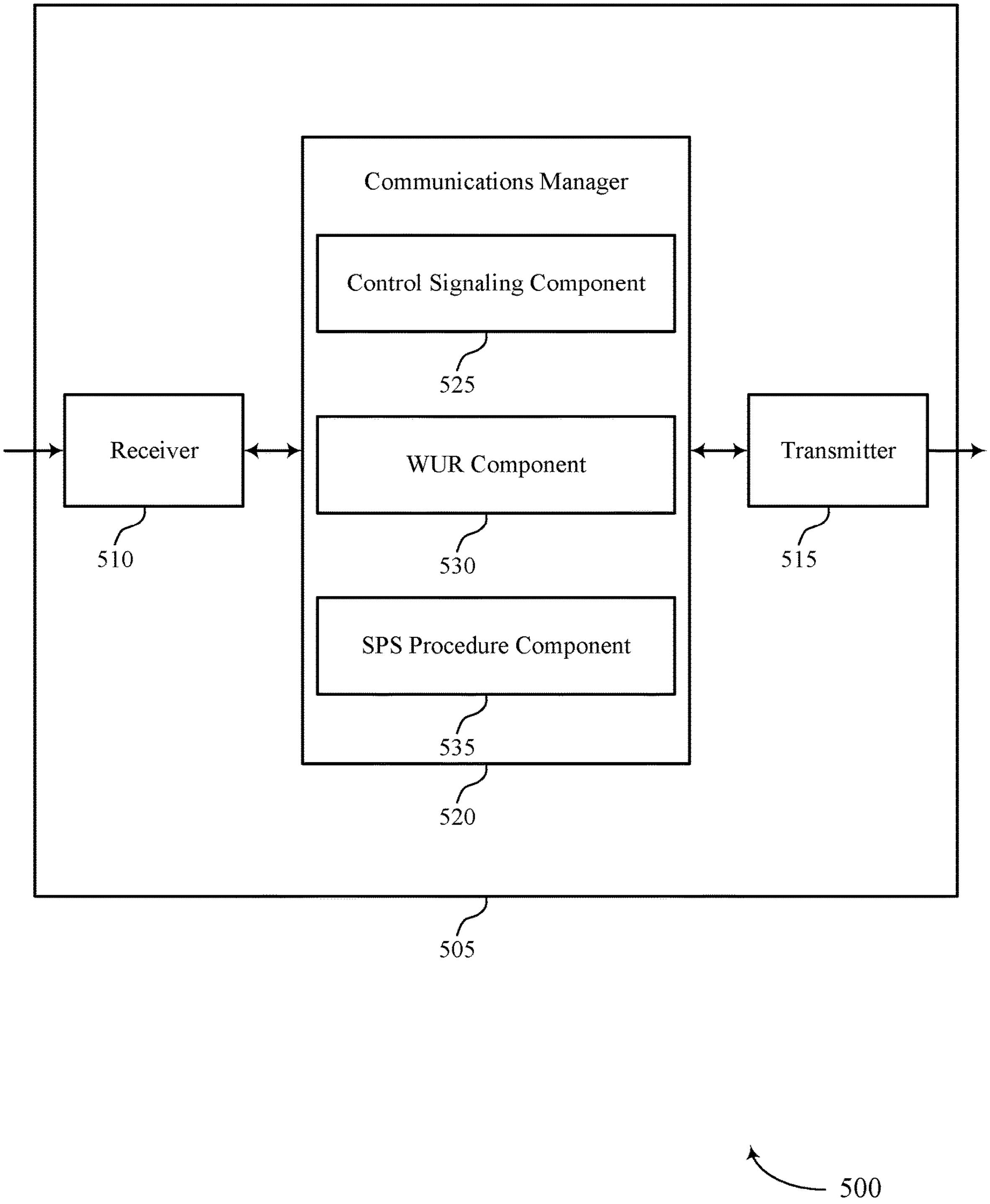

FIG. 5 shows a block diagram 500 of a device 505 that supports techniques to activate SPS occasions in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques to activate SPS occasions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques to activate SPS occasions). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques to activate SPS occasions as described herein. For example, the communications manager 520 may include a control signaling component 525, a WUR component 530, an SPS procedure component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The control signaling component 525 is capable of, configured to, or operable to support a means for receiving, via a first radio at the UE, control signaling that indicates a configuration associated with a WUS and that also indicates an association between the WUS and a SPS occasion. The WUR component 530 is capable of, configured to, or operable to support a means for monitoring, via a second radio at the UE, for the WUS in accordance with the configuration. The SPS procedure component 535 is capable of, configured to, or operable to support a means for performing one of a first procedure or a second procedure based on the monitoring, the first procedure pertaining to monitoring, via the first radio, the SPS occasion, and the second procedure pertaining to maintaining the first radio of the UE in a sleep mode.

Figure 6:
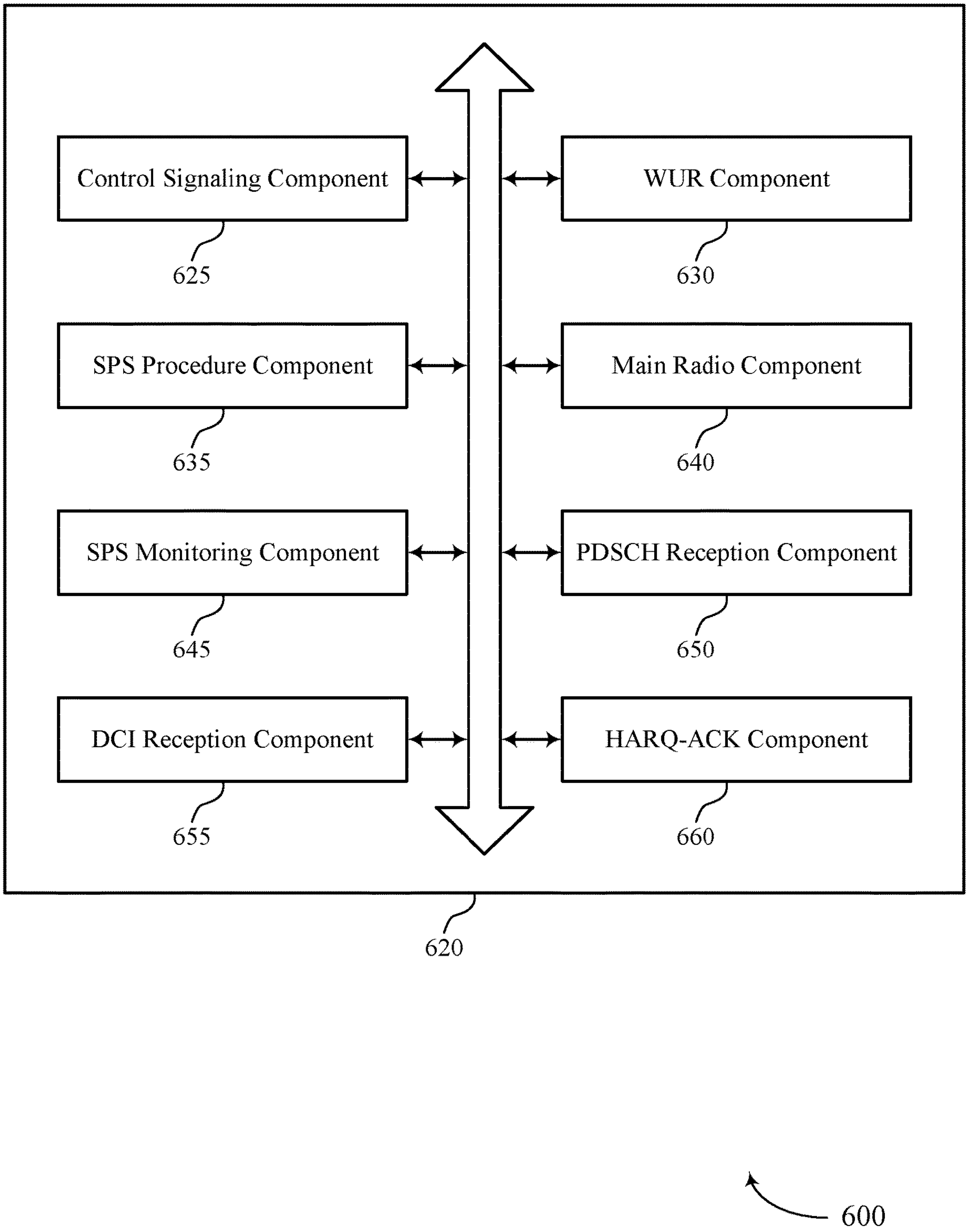
FIG. 6 shows a block diagram of a communications manager that supports techniques to activate SPS occasions in accordance with one or more aspects of the present disclosure.

FIG. 6 shows a block diagram 600 of a communications manager 620 that supports techniques to activate SPS occasions in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques to activate SPS occasions as described herein. For example, the communications manager 620 may include a control signaling component 625, a WUR component 630, an SPS procedure component 635, a main radio component 640, an SPS monitoring component 645, an PDSCH reception component 650, a DCI reception component 655, an HARQ-ACK component 660, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The control signaling component 625 is capable of, configured to, or operable to support a means for receiving, via a first radio at the UE, control signaling that indicates a configuration associated with a WUS and that also indicates an association between the WUS and a SPS occasion. The WUR component 630 is capable of, configured to, or operable to support a means for monitoring, via a second radio at the UE, for the WUS in accordance with the configuration. The SPS procedure component 635 is capable of, configured to, or operable to support a means for performing one of a first procedure or a second procedure based on the monitoring, the first procedure pertaining to monitoring, via the first radio, the SPS occasion, and the second procedure pertaining to maintaining the first radio of the UE in a sleep mode.

In some examples, to support performing the first procedure, the main radio component 640 is capable of, configured to, or operable to support a means for waking up the first radio of the UE. In some examples, to support performing the first procedure, the SPS monitoring component 645 is capable of, configured to, or operable to support a means for monitoring, based on waking up the first radio, the SPS occasion. In some examples, to support performing the first procedure, the PDSCH reception component 650 is capable of, configured to, or operable to support a means for receiving, via the first radio, the PDSCH based on the monitoring.

In some examples, the DCI reception component 655 is capable of, configured to, or operable to support a means for monitoring, prior to receiving the PDSCH, for DCI based on the WUS indicating that the SPS occasion includes the PDSCH, the DCI indicating a set of parameters for receiving the PDSCH.

In some examples, the set of parameters include a quantity of RBs of the SPS occasion, a MCS associated with the PDSCH, a set of resources for indicating feedback associated with the PDSCH, or a combination thereof.

In some examples, the DCI reception component 655 is capable of, configured to, or operable to support a means for refraining from monitoring for DCI based on the WUS further indicating for the UE to skip monitoring for the DCI. In some examples, the PDSCH reception component 650 is capable of, configured to, or operable to support a means for receiving the PDSCH via the SPS occasion according to a set of parameters indicated in the control signaling.

In some examples, the WUS indicating for the UE to skip monitoring for the DCI is based on a stability of a channel between the UE and a network entity, a variability of traffic load communicated via the channel, or both.

In some examples, the PDSCH carries data associated with extended reality applications.

In some examples, the PDSCH is a retransmission and. In some examples, the UE monitors for the retransmission or for a DCI that schedules the retransmission based on the WUS indicating that the SPS occasion includes the PDSCH.

In some examples, to support performing the second procedure, the main radio component 640 is capable of, configured to, or operable to support a means for refraining from waking up the first radio of the UE, where the first radio is maintained in the sleep mode based on refraining from waking up the first radio.

In some examples, the HARQ-ACK component 660 is capable of, configured to, or operable to support a means for refraining from transmitting feedback information associated with the PDSCH based on the WUS indicating that the SPS occasion does not include the PDSCH.

In some examples, the WUR component 630 is capable of, configured to, or operable to support a means for performing the second procedure based on an absence of the WUS during resources associated with the WUS, where the absence of the WUS during the resources indicates that the SPS occasion does not include a PDSCH.

In some examples, the WUR component 630 is capable of, configured to, or operable to support a means for performing the first procedure based on an absence of the WUS during resources associated with the WUS, where the absence of the WUS during the resources indicates that the SPS occasion includes a PDSCH.

In some examples, the control signaling further indicates a jitter range associated with the SPS occasion, and monitoring the WUS is in accordance with the jitter range associated with the SPS occasion.

In some examples, performance of the first procedure or the second procedure is based on bit values of one or more bits of the WUS.

In some examples, performance of the first procedure or the second procedure is based on a modulation scheme of the WUS, a data rate of a symbol used to transmit the WUS, a waveform pattern of the WUS, or a combination thereof.

In some examples, a periodicity of the WUS is based on a periodicity of the SPS occasion.

In some examples, the WUS is a low-power WUS.

Figure 7:
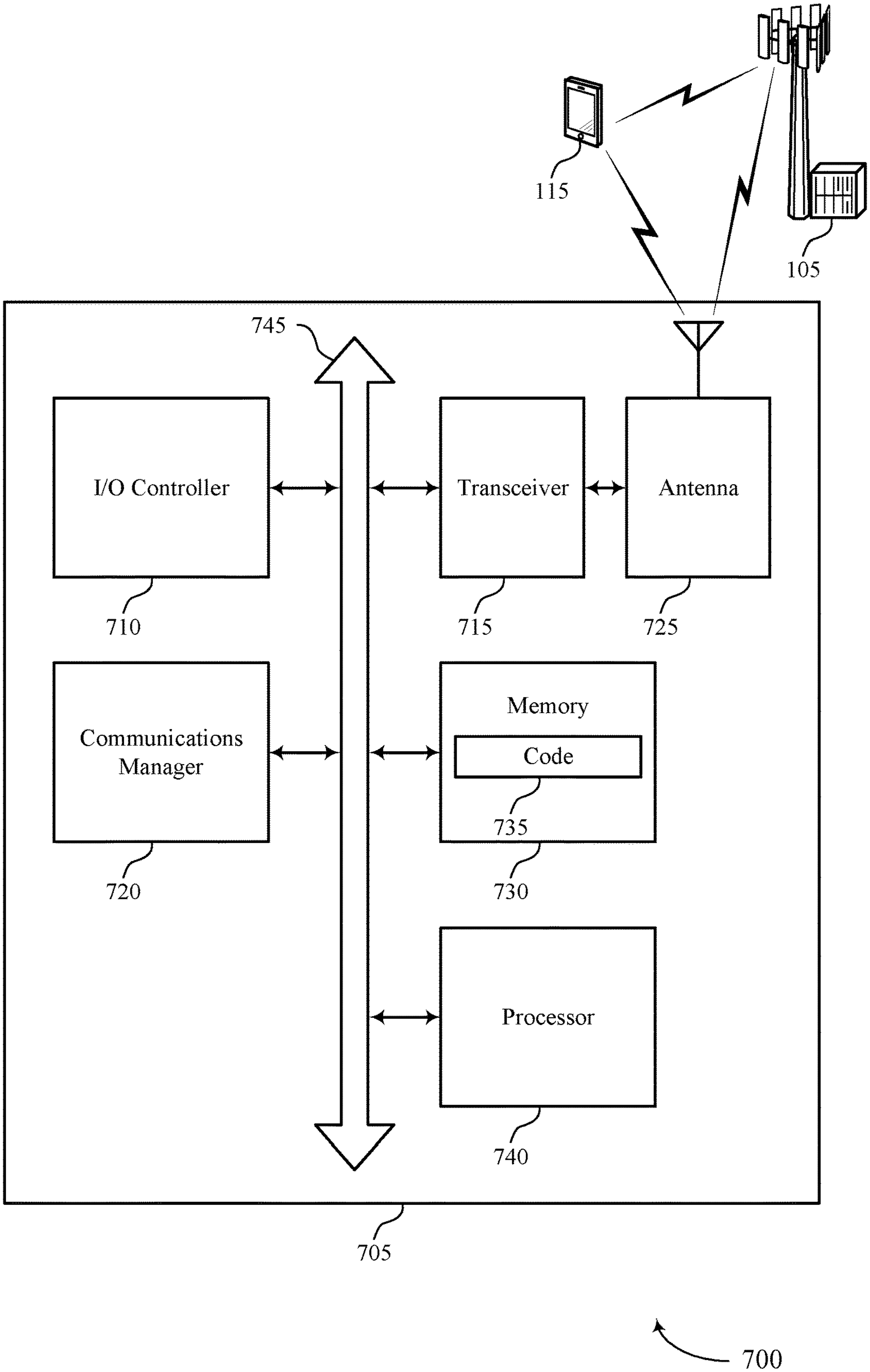
FIG. 7 shows a diagram of a system including a device that supports techniques to activate SPS occasions in accordance with one or more aspects of the present disclosure.

FIG. 7 shows a diagram of a system 700 including a device 705 that supports techniques to activate SPS occasions in accordance with one or more aspects of the present disclosure. The device 705 may be an example of or include components of a device 405, a device 505, or a UE 115 as described herein. The device 705 may communicate (e.g., wirelessly) with one or more other devices (e.g., network entities 105, UEs 115, or a combination thereof). The device 705 may include components for bi-directional voice and data communications including components for transmitting and receiving communications, such as a communications manager 720, an input/output (I/O) controller, such as an I/O controller 710, a transceiver 715, one or more antennas 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna. However, in some other cases, the device 705 may have more than one antenna, which may be capable of concurrently transmitting or receiving multiple wireless transmissions. The transceiver 715 may communicate bi-directionally via the one or more antennas 725 using wired or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable, or processor-executable code, such as the code 735. The code 735 may include instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may include, among other things, a basic I/O system (BIOS) which may control basic hardware or software operation such as the interaction with peripheral components or devices.

The at least one processor 740 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting techniques to activate SPS occasions). For example, the device 705 or a component of the device 705 may include at least one processor 740 and at least one memory 730 coupled with or to the at least one processor 740, the at least one processor 740 and the at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions described herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code 735 (e.g., processor-executable code) stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for receiving, via a first radio at the UE, control signaling that indicates a configuration associated with a WUS and that also indicates an association between the WUS and a SPS occasion. The communications manager 720 is capable of, configured to, or operable to support a means for monitoring, via a second radio at the UE, for the WUS in accordance with the configuration. The communications manager 720 is capable of, configured to, or operable to support a means for performing one of a first procedure or a second procedure based on the monitoring, the first procedure pertaining to monitoring, via the first radio, the SPS occasion, and the second procedure pertaining to maintaining the first radio of the UE in a sleep mode.

By including or configuring the communications manager 720 in accordance with examples as described herein, the device 705 may support techniques for indicating empty SPS occasions via a WUS, which may provide for reduced processing, reduced power consumption, and a more efficient utilization of communication resources.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of techniques to activate SPS occasions as described herein, or the at least one processor 740 and the at least one memory 730 may be otherwise configured to, individually or collectively, perform or support such operations.

Figure 8:
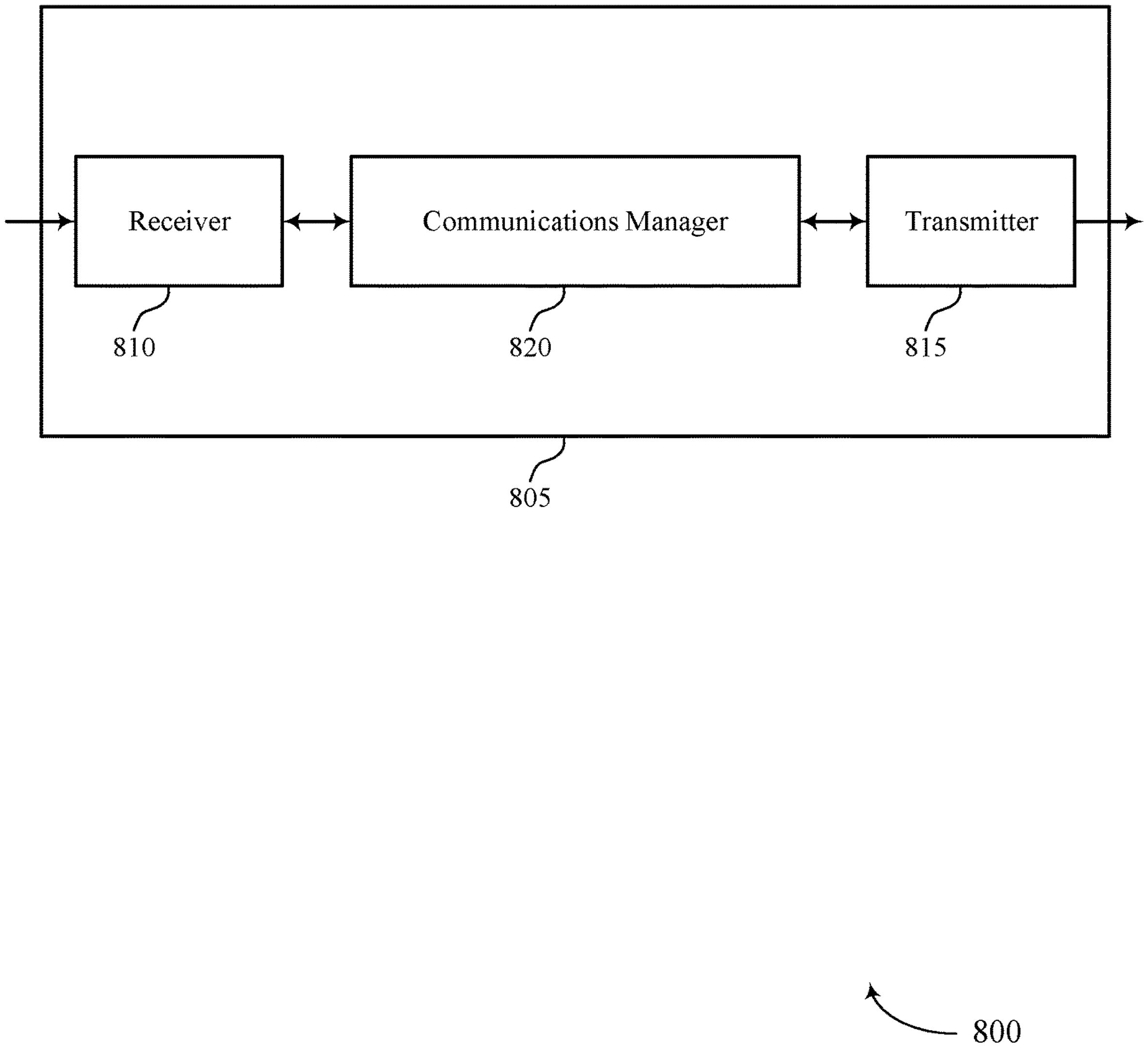
FIGS. 8 and 9 show block diagrams of devices that support techniques to activate SPS occasions in accordance with one or more aspects of the present disclosure.

FIG. 8 shows a block diagram 800 of a device 805 that supports techniques to activate SPS occasions in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations or components thereof may be examples of means for performing various aspects of techniques to activate SPS occasions as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor (e.g., referred to as a processor-executable code). If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for transmitting control signaling that indicates a configuration associated with a WUS and that also indicates an association between the WUS and a SPS occasion. The communications manager 820 is capable of, configured to, or operable to support a means for transmitting the WUS in accordance with the configuration, where the WUS indicates to a UE whether the SPS occasion includes a PDSCH.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for indicating empty SPS occasions via a WUS, which may provide for reduced processing, reduced power consumption, and a more efficient utilization of communication resources.

Figure 9:
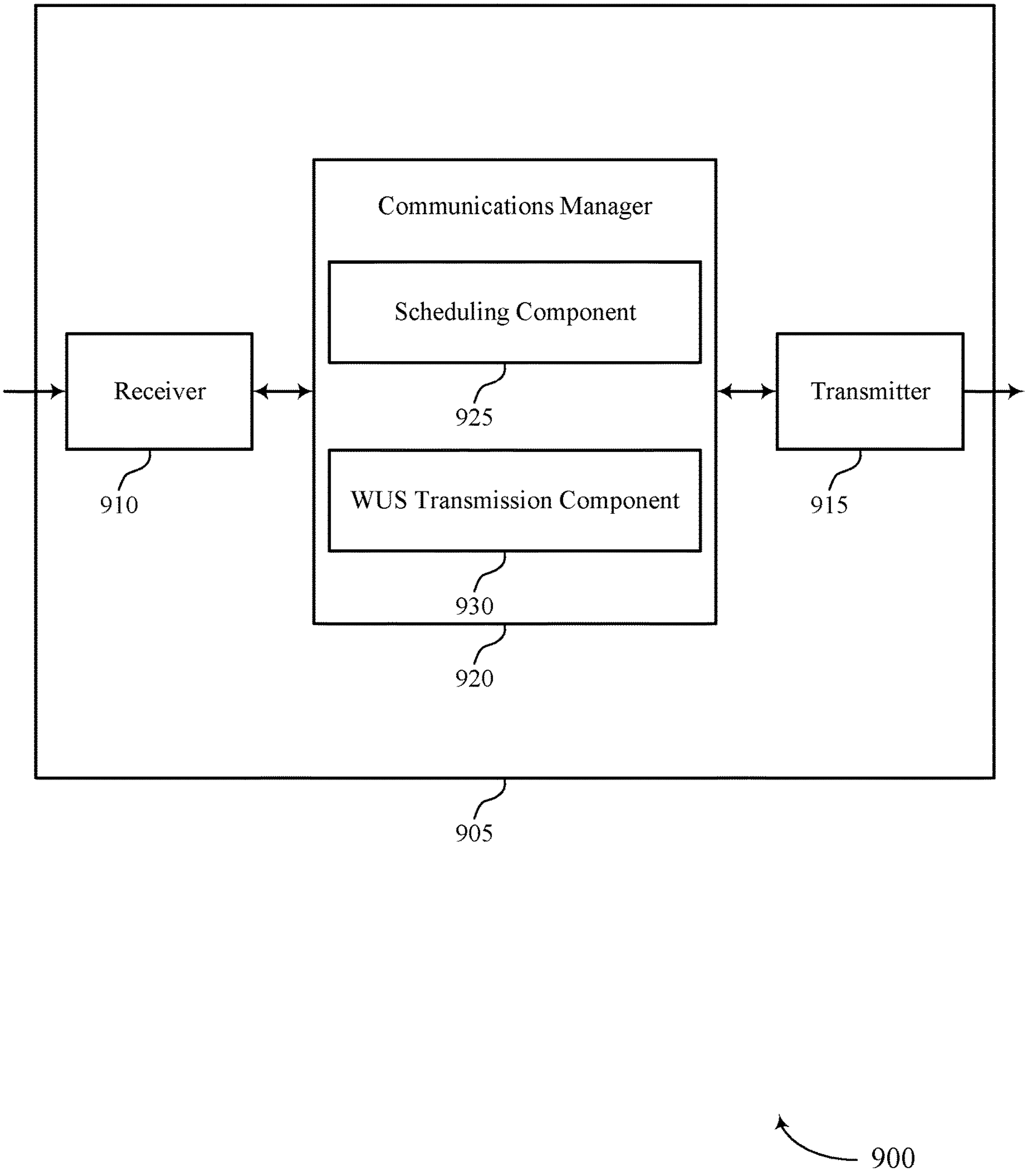

FIG. 9 shows a block diagram 900 of a device 905 that supports techniques to activate SPS occasions in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques to activate SPS occasions as described herein. For example, the communications manager 920 may include a scheduling component 925 a WUS transmission component 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The scheduling component 925 is capable of, configured to, or operable to support a means for transmitting control signaling that indicates a configuration associated with a WUS and that also indicates an association between the WUS and a SPS occasion. The WUS transmission component 930 is capable of, configured to, or operable to support a means for transmitting the WUS in accordance with the configuration, where the WUS indicates to a UE whether the SPS occasion includes a PDSCH.

Figure 10:
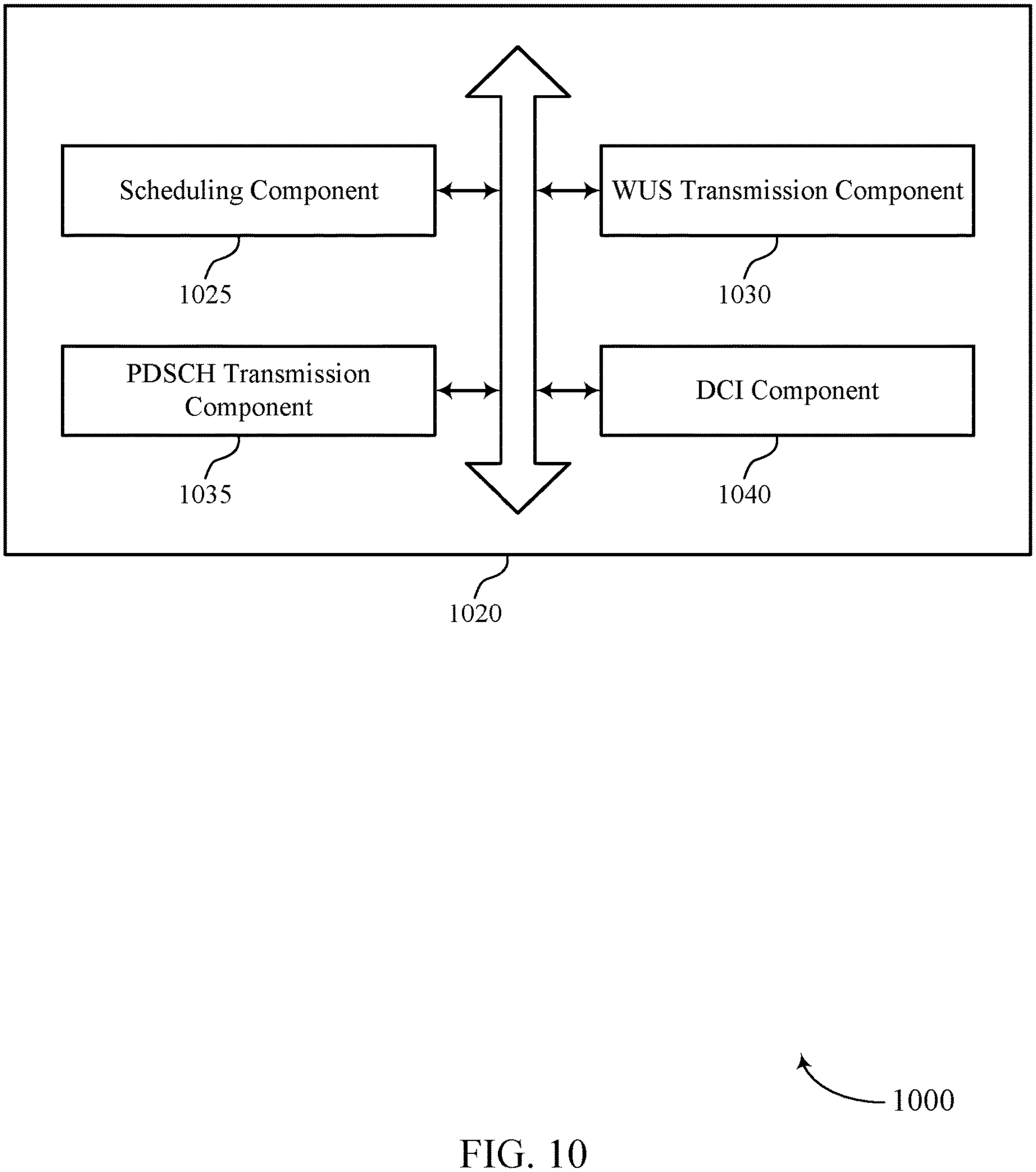
FIG. 10 shows a block diagram of a communications manager that supports techniques to activate SPS occasions in accordance with one or more aspects of the present disclosure.

FIG. 10 shows a block diagram 1000 of a communications manager 1020 that supports techniques to activate SPS occasions in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques to activate SPS occasions as described herein. For example, the communications manager 1020 may include a scheduling component 1025, a WUS transmission component 1030, an PDSCH transmission component 1035, a DCI component 1040, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The scheduling component 1025 is capable of, configured to, or operable to support a means for transmitting control signaling that indicates a configuration associated with a WUS and that also indicates an association between the WUS and a SPS occasion. The WUS transmission component 1030 is capable of, configured to, or operable to support a means for transmitting the WUS in accordance with the configuration, where the WUS indicates to a UE whether the SPS occasion includes a PDSCH.

In some examples, the WUS indicates that the SPS occasion includes the PDSCH, and the PDSCH transmission component 1035 is capable of, configured to, or operable to support a means for transmitting, via the SPS occasion, the PDSCH.

In some examples, the DCI component 1040 is capable of, configured to, or operable to support a means for transmitting, prior to transmitting the PDSCH, DCI that indicates a set of parameters associated with receiving the PDSCH.

In some examples, the set of parameters include a quantity of RBs of the SPS occasion, a MCS associated with the PDSCH, a set of resources for indicating feedback associated with the PDSCH, or a combination thereof.

In some examples, the DCI component 1040 is capable of, configured to, or operable to support a means for refraining from transmitting DCI based on the WUS further indicating for the UE to skip monitoring for the DCI.

In some examples, the WUS indicates for the UE to skip monitoring for the DCI is based on a stability of a channel between the UE and the network entity, a variability of traffic load communicated via the channel, or both.

In some examples, the PDSCH carries data associated with extended reality applications.

In some examples, the WUS indicates that the SPS occasion does not include the PDSCH, and the PDSCH transmission component 1035 is capable of, configured to, or operable to support a means for refraining from transmitting the PDSCH via the SPS occasion.

In some examples, the WUS transmission component 1030 is capable of, configured to, or operable to support a means for transmitting the WUS according to a periodicity that is based on a periodicity of the SPS occasion.

In some examples, the control signaling further indicates a jitter range associated with the SPS occasion, and transmitting the WUS is in accordance with the jitter range associated with the SPS occasion.

In some examples, bit values of one or more bits of the WUS indicate whether the SPS occasion includes the PDSCH.

In some examples, a modulation scheme of the WUS, a data rate of a symbol used to transmit the WUS, a waveform pattern of the WUS, or a combination thereof, indicate whether the SPS occasion includes the PDSCH.

In some examples, the WUS is a low-power WUS.

Figure 11:
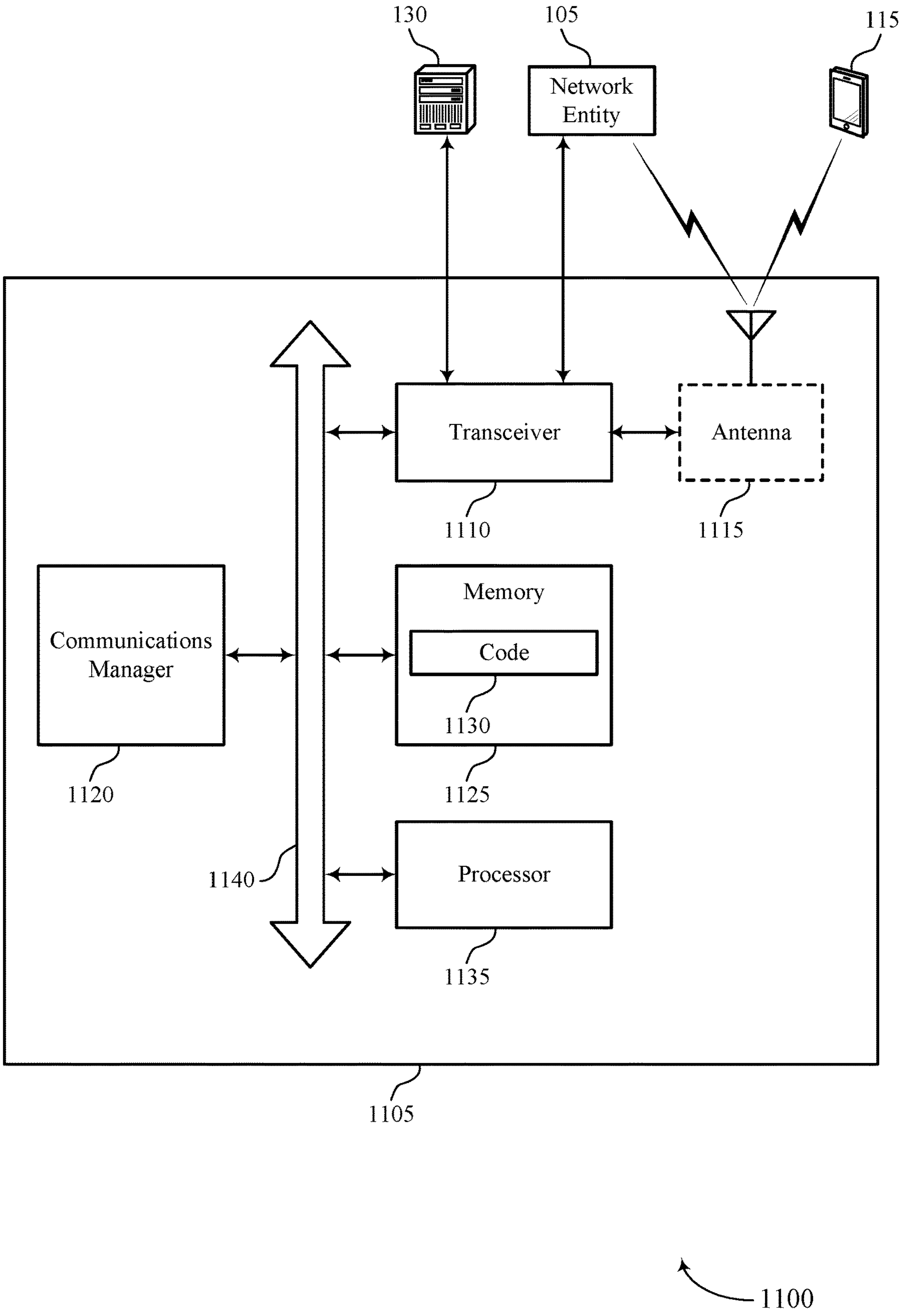
FIG. 11 shows a diagram of a system including a device that supports techniques to activate SPS occasions in accordance with one or more aspects of the present disclosure.

FIG. 11 shows a diagram of a system 1100 including a device 1105 that supports techniques to activate SPS occasions in accordance with one or more aspects of the present disclosure. The device 1105 may be an example of or include components of a device 805, a device 905, or a network entity 105 as described herein. The device 1105 may communicate with other network devices or network equipment such as one or more of the network entities 105, UEs 115, or any combination thereof. The communications may include communications over one or more wired interfaces, over one or more wireless interfaces, or any combination thereof. The device 1105 may include components that support outputting and obtaining communications, such as a communications manager 1120, a transceiver 1110, one or more antennas 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., communication link(s) 125, backhaul communication link(s) 120, a midhaul communication link 162, a fronthaul communication link 168).

The at least one memory 1125 may include RAM, ROM, or any combination thereof. The at least one memory 1125 may store computer-readable, computer-executable, or processor-executable code, such as the code 1130. The code 1130 may include instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may include, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting techniques to activate SPS occasions). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. For example, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with one or more other network entities 105, and may include a controller or scheduler for controlling communications with UEs 115 (e.g., in cooperation with the one or more other network devices). In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for transmitting control signaling that indicates a configuration associated with a WUS and that also indicates an association between the WUS and a SPS occasion. The communications manager 1120 is capable of, configured to, or operable to support a means for transmitting the WUS in accordance with the configuration, where the WUS indicates to a UE whether the SPS occasion includes a PDSCH.

By including or configuring the communications manager 1120 in accordance with examples as described herein, the device 1105 may support techniques for indicating empty SPS occasions via a WUS, which may provide for reduced processing, reduced power consumption, and a more efficient utilization of communication resources.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of techniques to activate SPS occasions as described herein, or the at least one processor 1135 and the at least one memory 1125 may be otherwise configured to, individually or collectively, perform or support such operations.

Figure 12:
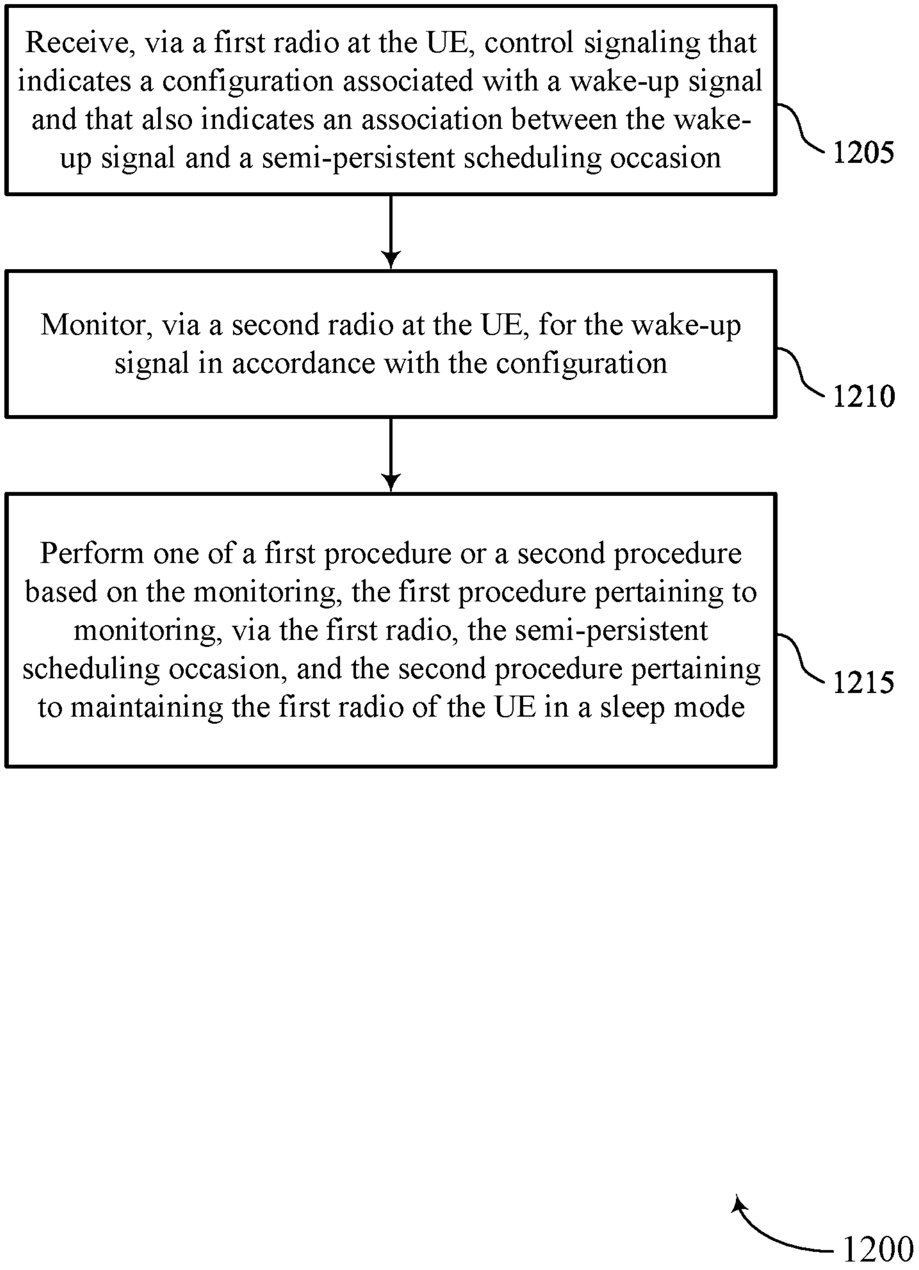
FIGS. 12 through 15 show flowcharts illustrating methods that support techniques to activate SPS occasions in accordance with one or more aspects of the present disclosure.

FIG. 12 shows a flowchart illustrating a method 1200 that supports techniques to activate SPS occasions in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving, via a first radio at the UE, control signaling that indicates a configuration associated with a WUS and that also indicates an association between the WUS and a SPS occasion. The operations of 1205 may be performed in accordance with examples as disclosed herein. In some examples, aspects of the operations of 1205 may be performed by a control signaling component 625 as described with reference to FIG. 6.

At 1210, the method may include monitoring, via a second radio at the UE, for the WUS in accordance with the configuration. The operations of 1210 may be performed in accordance with examples as disclosed herein. In some examples, aspects of the operations of 1210 may be performed by a WUR component 630 as described with reference to FIG. 6.

At 1215, the method may include performing one of a first procedure or a second procedure based on the monitoring, the first procedure pertaining to monitoring, via the first radio, the SPS occasion, and the second procedure pertaining to maintaining the first radio of the UE in a sleep mode. The operations of 1215 may be performed in accordance with examples as disclosed herein. In some examples, aspects of the operations of 1215 may be performed by an SPS procedure component 635 as described with reference to FIG. 6.

Figure 13:
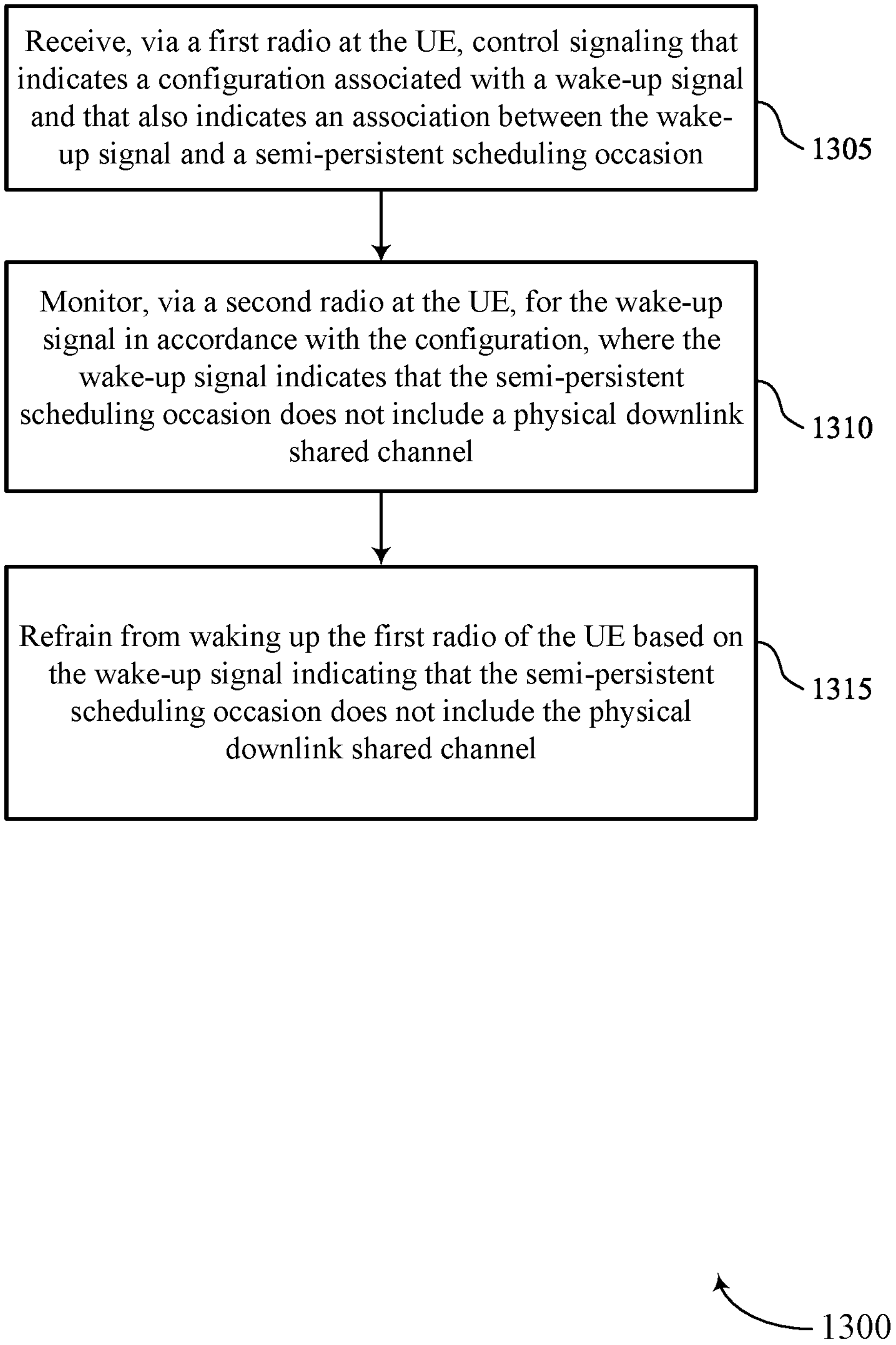

FIG. 13 shows a flowchart illustrating a method 1300 that supports techniques to activate SPS occasions in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving, via a first radio at the UE, control signaling that indicates a configuration associated with a WUS and that also indicates an association between the WUS and a SPS occasion. The operations of 1305 may be performed in accordance with examples as disclosed herein. In some examples, aspects of the operations of 1305 may be performed by a control signaling component 625 as described with reference to FIG. 6.

At 1310, the method may include monitoring, via a second radio at the UE, for the WUS in accordance with the configuration, where the WUS indicates that the SPS occasion does not include a PDSCH. The operations of 1310 may be performed in accordance with examples as disclosed herein. In some examples, aspects of the operations of 1310 may be performed by a WUR component 630 as described with reference to FIG. 6.

At 1315, the method may include refraining from waking up the first radio of the UE based on the WUS indicating that the SPS occasion does not include the PDSCH. The operations of 1315 may be performed in accordance with examples as disclosed herein. In some examples, aspects of the operations of 1315 may be performed by a main radio component 640 as described with reference to FIG. 6.

Figure 14:
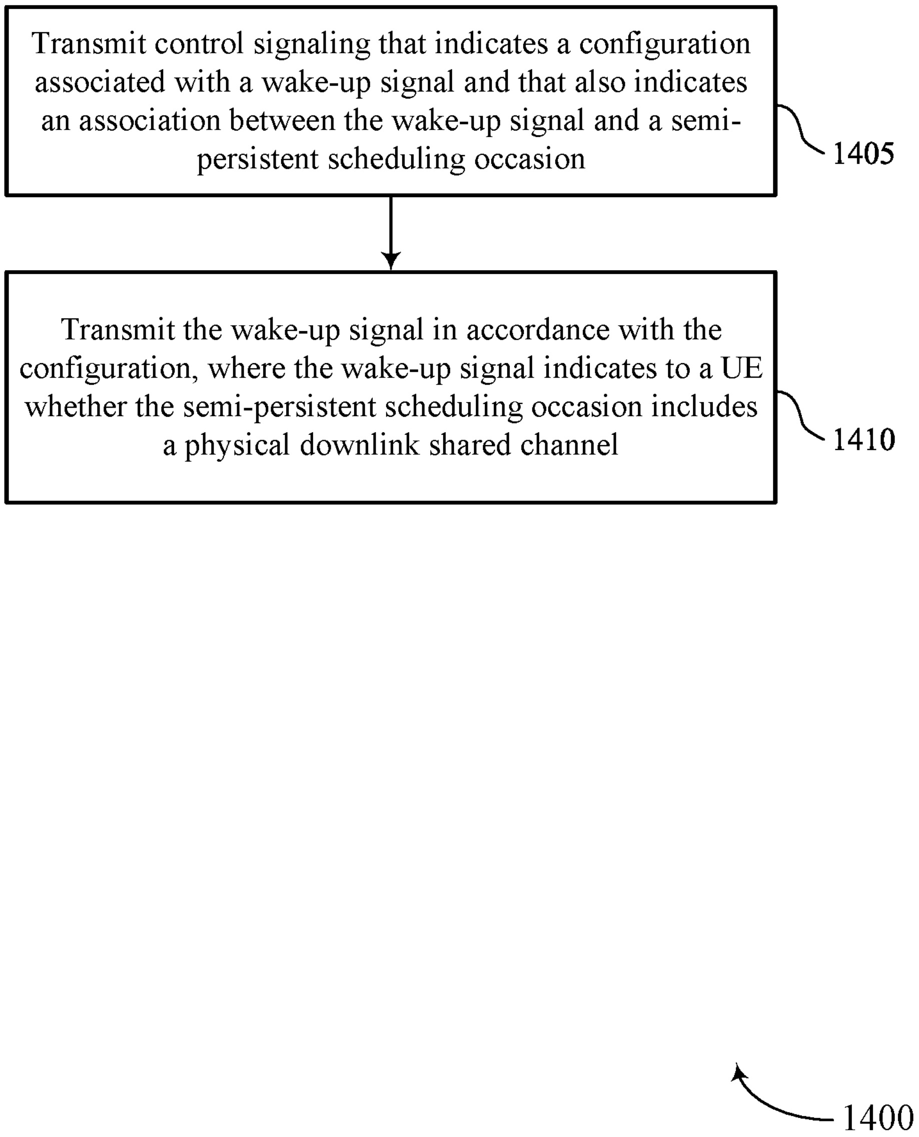

FIG. 14 shows a flowchart illustrating a method 1400 that supports techniques to activate SPS occasions in accordance with one or more aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include transmitting control signaling that indicates a configuration associated with a WUS and that also indicates an association between the WUS and a SPS occasion. The operations of 1405 may be performed in accordance with examples as disclosed herein. In some examples, aspects of the operations of 1405 may be performed by a scheduling component 1025 as described with reference to FIG. 10.

At 1410, the method may include transmitting the WUS in accordance with the configuration, where the WUS indicates to a UE whether the SPS occasion includes a PDSCH. The operations of 1410 may be performed in accordance with examples as disclosed herein. In some examples, aspects of the operations of 1410 may be performed by a WUS transmission component 1030 as described with reference to FIG. 10.

Figure 15:
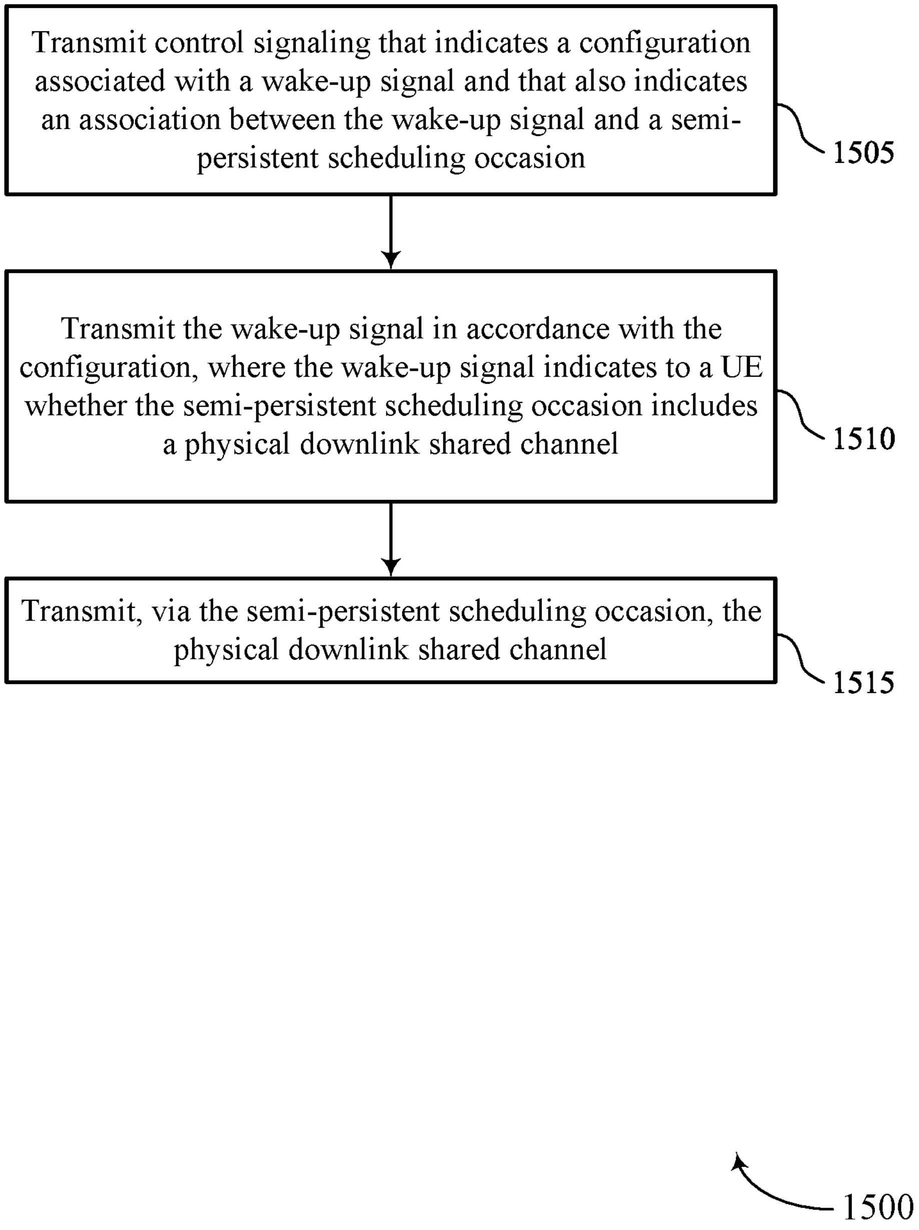

FIG. 15 shows a flowchart illustrating a method 1500 that supports techniques to activate SPS occasions in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include transmitting control signaling that indicates a configuration associated with a WUS and that also indicates an association between the WUS and a SPS occasion. The operations of 1505 may be performed in accordance with examples as disclosed herein. In some examples, aspects of the operations of 1505 may be performed by a scheduling component 1025 as described with reference to FIG. 10.

At 1510, the method may include transmitting the WUS in accordance with the configuration, where the WUS indicates to a UE whether the SPS occasion includes a PDSCH. The operations of 1510 may be performed in accordance with examples as disclosed herein. In some examples, aspects of the operations of 1510 may be performed by a WUS transmission component 1030 as described with reference to FIG. 10.

At 1515, the method may include transmitting, via the SPS occasion, the PDSCH. The operations of 1515 may be performed in accordance with examples as disclosed herein. In some examples, aspects of the operations of 1515 may be performed by an PDSCH transmission component 1035 as described with reference to FIG. 10.

The following provides an overview of aspects of the present disclosure:

Aspect 1: A method for wireless communications at a UE, comprising: receiving, via a first radio at the UE, control signaling that indicates a configuration associated with a WUS and that also indicates an association between the WUS and a SPS occasion; monitoring, via a second radio at the UE, for the WUS in accordance with the configuration; and performing one of a first procedure or a second procedure based at least in part on the monitoring, the first procedure pertaining to monitoring, via the first radio, the SPS occasion, and the second procedure pertaining to maintaining the first radio of the UE in a sleep mode.

Aspect 2: The method of aspect 1, wherein the UE performs the first procedure based at least in part on the WUS indicating that the SPS occasion includes a PDSCH, wherein performing the first procedure comprises: waking up the first radio of the UE; monitoring, based at least in part on waking up the first radio, the SPS occasion; and receiving, via the first radio, the PDSCH based at least in part on the monitoring.

Aspect 3: The method of aspect 2, further comprising: monitoring, prior to receiving the PDSCH, for DCI based at least in part on the WUS indicating that the SPS occasion includes the PDSCH, the DCI indicating a set of parameters for receiving the PDSCH.

Aspect 4: The method of aspect 3, wherein the set of parameters comprise a quantity of RBs of the SPS occasion, a MCS associated with the PDSCH, a set of resources for indicating feedback associated with the PDSCH, or a combination thereof.

Aspect 5: The method of any of aspects 2 through 4, further comprising: refraining from monitoring for DCI based at least in part on the WUS further indicating for the UE to skip monitoring for the DCI, wherein receiving the PDSCH comprises: receiving the PDSCH via the SPS occasion according to a set of parameters indicated in the control signaling.

Aspect 6: The method of aspect 5, wherein the WUS indicating for the UE to skip monitoring for the DCI is based at least in part on a stability of a channel between the UE and a network entity, a variability of traffic load communicated via the channel, or both.

Aspect 7: The method of any of aspects 2 through 6, wherein the PDSCH carries data associated with XR applications.

Aspect 8: The method of any of aspects 2 through 7, wherein the PDSCH is a retransmission and the UE monitors for the retransmission or for a DCI that schedules the retransmission based at least in part on the WUS indicating that the SPS occasion includes the PDSCH.

Aspect 9: The method of any of aspects 1 through 8, wherein the UE performs the second procedure based at least in part on the WUS indicating that the SPS occasion does not include a PDSCH, wherein performing the second procedure comprises: refraining from waking up the first radio of the UE, wherein the first radio is maintained in the sleep mode based at least in part on refraining from waking up the first radio.

Aspect 10: The method of aspect 9, further comprising: refraining from transmitting feedback information associated with the PDSCH based at least in part on the WUS indicating that the SPS occasion does not include the PDSCH.

Aspect 11: The method of any of aspects 1 through 10, further comprising: performing the second procedure based at least in part on an absence of the WUS during resources associated with the WUS, wherein the absence of the WUS during the resources indicates that the SPS occasion does not include a PDSCH.

Aspect 12: The method of any of aspects 1 through 11, further comprising: performing the first procedure based at least in part on an absence of the WUS during resources associated with the WUS, wherein the absence of the WUS during the resources indicates that the SPS occasion includes a PDSCH.

Aspect 13: The method of any of aspects 1 through 12, wherein the control signaling further indicates a jitter range associated with the SPS occasion, and monitoring the WUS is in accordance with the jitter range associated with the SPS occasion.

Aspect 14: The method of any of aspects 1 through 13, wherein performance of the first procedure or the second procedure is based at least in part on bit values of one or more bits of the WUS.

Aspect 15: The method of any of aspects 1 through 14, wherein performance of the first procedure or the second procedure is based at least in part on a modulation scheme of the WUS, a data rate of a symbol used to transmit the WUS, a waveform pattern of the WUS, or a combination thereof.

Aspect 16: The method of any of aspects 1 through 15, wherein a periodicity of the WUS is based at least in part on a periodicity of the SPS occasion.

Aspect 17: The method of any of aspects 1 through 16, wherein the WUS is a low-power WUS.

Aspect 18: A method for wireless communications at a network entity comprising: transmitting control signaling that indicates a configuration associated with a WUS and that also indicates an association between the WUS and a SPS occasion; and transmitting the WUS in accordance with the configuration, wherein the WUS indicates to a UE whether the SPS occasion includes a PDSCH.

Aspect 19: The method of aspect 18, wherein the WUS indicates that the SPS occasion includes the PDSCH, the method further comprising: transmitting, via the SPS occasion, the PDSCH.

Aspect 20: The method of aspect 19, further comprising: transmitting, prior to transmitting the PDSCH, DCI that indicates a set of parameters associated with receiving the PDSCH.

Aspect 21: The method of aspect 20, wherein the set of parameters comprise a quantity of RBs of the SPS occasion, a MCS associated with the PDSCH, a set of resources for indicating feedback associated with the PDSCH, or a combination thereof.

Aspect 22: The method of any of aspects 19 through 21, further comprising: refraining from transmitting DCI based at least in part on the WUS further indicating for the UE to skip monitoring for the DCI.

Aspect 23: The method of aspect 22, wherein the WUS indicates for the UE to skip monitoring for the DCI is based at least in part on a stability of a channel between the UE and the network entity, a variability of traffic load communicated via the channel, or both.

Aspect 24: The method of any of aspects 19 through 23, wherein the PDSCH carries data associated with XR applications.

Aspect 25: The method of any of aspects 18 through 24, wherein the WUS indicates that the SPS occasion does not include the PDSCH, the method further comprising: refraining from transmitting the PDSCH via the SPS occasion.

Aspect 26: The method of any of aspects 18 through 25, further comprising: transmitting the WUS according to a periodicity that is based at least in part on a periodicity of the SPS occasion.

Aspect 27: The method of any of aspects 18 through 26, wherein the control signaling further indicates a jitter range associated with the SPS occasion, and transmitting the WUS is in accordance with the jitter range associated with the SPS occasion.

Aspect 28: The method of any of aspects 18 through 27, wherein bit values of one or more bits of the WUS indicate whether the SPS occasion includes the PDSCH.

Aspect 29: The method of any of aspects 18 through 28, wherein a modulation scheme of the WUS, a data rate of a symbol used to transmit the WUS, a waveform pattern of the WUS, or a combination thereof, indicate whether the SPS occasion includes the PDSCH.

Aspect 30: The method of any of aspects 18 through 29, wherein the WUS is a low-power WUS.

Aspect 31: A UE for wireless communications, comprising one or more memories storing processor-executable code, and one or more processors coupled with the one or more memories and individually or collectively operable to execute the code to cause the UE to perform a method of any of aspects 1 through 17.

Aspect 32: A UE for wireless communications, comprising at least one means for performing a method of any of aspects 1 through 17.

Aspect 33: A non-transitory computer-readable medium storing code for wireless communications, the code comprising instructions executable by one or more processors to perform a method of any of aspects 1 through 17.

Aspect 34: An apparatus for wireless communications, comprising one or more memories storing processor-executable code, and one or more processors coupled with the one or more memories and individually or collectively operable to execute the code to cause the apparatus to perform a method of any of aspects 18 through 30.

Aspect 35: An apparatus for wireless communications, comprising at least one means for performing a method of any of aspects 18 through 30.

Aspect 36: A non-transitory computer-readable medium storing code for wireless communications, the code comprising instructions executable by one or more processors to perform a method of any of aspects 18 through 30.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive, via a first radio at the UE, control signaling that indicates a configuration associated with a wake-up signal and that also indicates an association between the wake-up signal and a semi-persistent scheduling occasion;
monitor, via a second radio at the UE, for the wake-up signal in accordance with the configuration; and
perform one of a first procedure or a second procedure based at least in part on the monitoring, the first procedure pertaining to monitoring, via the first radio, the semi-persistent scheduling occasion, and the second procedure pertaining to maintaining the first radio of the UE in a sleep mode.

2. The UE of claim 1, wherein the UE performs the first procedure based at least in part on the wake-up signal indicating that the semi-persistent scheduling occasion includes a physical downlink shared channel, and wherein, to perform the first procedure, the one or more processors are individually or collectively operable to execute the code to cause the UE to:
wake up the first radio of the UE;
monitor, based at least in part on waking up the first radio, the semi-persistent scheduling occasion; and
receive, via the first radio, the physical downlink shared channel based at least in part on the monitoring.

3. The UE of claim 2, wherein the one or more processors are individually or collectively further operable to execute the code to cause the UE to:
monitor, prior to receiving the physical downlink shared channel, for downlink control information based at least in part on the wake-up signal indicating that the semi-persistent scheduling occasion includes the physical downlink shared channel, the downlink control information indicating a set of parameters for receiving the physical downlink shared channel.

4. The UE of claim 3, wherein the set of parameters comprise a quantity of resource blocks of the semi-persistent scheduling occasion, a modulation and coding scheme associated with the physical downlink shared channel, a set of resources for indicating feedback associated with the physical downlink shared channel, or a combination thereof.

5. The UE of claim 2, wherein the one or more processors are individually or collectively further operable to execute the code to cause the UE to:
refrain from monitoring for downlink control information based at least in part on the wake-up signal further indicating for the UE to skip monitoring for the downlink control information, wherein receiving the physical downlink shared channel comprises:
receive the physical downlink shared channel via the semi-persistent scheduling occasion according to a set of parameters indicated in the control signaling.

6. The UE of claim 5, wherein the wake-up signal indicating for the UE to skip monitoring for the downlink control information is based at least in part on a stability of a channel between the UE and a network entity, a variability of traffic load communicated via the channel, or both.

7. The UE of claim 2, wherein:
the physical downlink shared channel carries data associated with extended reality applications.

8. The UE of claim 2, wherein the physical downlink shared channel is a retransmission and the UE monitors for the retransmission or for a downlink control information that schedules the retransmission based at least in part on the wake-up signal indicating that the semi-persistent scheduling occasion includes the physical downlink shared channel.

9. The UE of claim 1, wherein, to perform the second procedure, the one or more processors are individually or collectively operable to execute the code to cause the UE to:
refrain from waking up the first radio of the UE, wherein the first radio is maintained in the sleep mode based at least in part on refraining from waking up the first radio.

10. The UE of claim 9, wherein the UE performs the second procedure based at least in part on the wake-up signal indicating that the semi-persistent scheduling occasion does not include a physical downlink shared channel, and wherein, to perform the second procedure, the one or more processors are individually or collectively operable to execute the code to cause the UE to:
refrain from transmitting feedback information associated with the physical downlink shared channel based at least in part on the wake-up signal indicating that the semi-persistent scheduling occasion does not include the physical downlink shared channel.

11. The UE of claim 1, wherein the one or more processors are individually or collectively further operable to execute the code to cause the UE to:
perform the second procedure based at least in part on an absence of the wake-up signal during resources associated with the wake-up signal, wherein the absence of the wake-up signal during the resources indicates that the semi-persistent scheduling occasion does not include a physical downlink shared channel.

12. The UE of claim 1, wherein the one or more processors are individually or collectively further operable to execute the code to cause the UE to:
perform the first procedure based at least in part on an absence of the wake-up signal during resources associated with the wake-up signal, wherein the absence of the wake-up signal during the resources indicates that the semi-persistent scheduling occasion includes a physical downlink shared channel.

13. The UE of claim 1, wherein the control signaling further indicates a jitter range associated with the semi-persistent scheduling occasion, and monitoring the wake-up signal is in accordance with the jitter range associated with the semi-persistent scheduling occasion.

14. The UE of claim 1, wherein performance of the first procedure or the second procedure is based at least in part on bit values of one or more bits of the wake-up signal.

15. The UE of claim 1, wherein performance of the first procedure or the second procedure is based at least in part on a modulation scheme of the wake-up signal, a data rate of a symbol used to transmit the wake-up signal, a waveform pattern of the wake-up signal, or a combination thereof.

16. The UE of claim 1, wherein a periodicity of the wake-up signal is based at least in part on a periodicity of the semi-persistent scheduling occasion.

17. The UE of claim 1, wherein the wake-up signal is a low-power wake-up signal.

18. A network entity, comprising:

one or more memories storing processor-executable code; and one or more processors coupled with the one or more memories and individually or collectively operable to execute the code to cause the network entity to:

transmit control signaling that indicates a configuration associated with a wake-up signal and that also indicates an association between the wake-up signal and a semi-persistent scheduling occasion; and transmit the wake-up signal in accordance with the configuration, wherein the wake-up signal indicates to a user equipment (UE) whether the semi-persistent scheduling occasion includes a physical downlink shared channel.

19. The network entity of claim 18, wherein the wake-up signal indicates that the semi-persistent scheduling occasion includes the physical downlink shared channel, and the one or more processors are individually or collectively further operable to execute the code to cause the network entity to:

transmit, via the semi-persistent scheduling occasion, the physical downlink shared channel.

20. The network entity of claim 19, wherein the one or more processors are individually or collectively further operable to execute the code to cause the network entity to:

transmit, prior to transmitting the physical downlink shared channel, downlink control information that indicates a set of parameters associated with receiving the physical downlink shared channel.

21. The network entity of claim 20, wherein the set of parameters comprise a quantity of resource blocks of the semi-persistent scheduling occasion, a modulation and coding scheme associated with the physical downlink shared channel, a set of resources for indicating feedback associated with the physical downlink shared channel, or a combination thereof.

22. The network entity of claim 19, wherein the one or more processors are individually or collectively further operable to execute the code to cause the network entity to:

refrain from transmitting downlink control information based at least in part on the wake-up signal further indicating for the UE to skip monitoring for the downlink control information.

23. The network entity of claim 22, wherein the wake-up signal indicating for the UE to skip monitoring for the downlink control information is based at least in part on a stability of a channel between the UE and the network entity, a variability of traffic load communicated via the channel, or both.

24. The network entity of claim 19, wherein:

the physical downlink shared channel carries data associated with extended reality applications.

25. The network entity of claim 18, wherein the wake-up signal indicates that the semi-persistent scheduling occasion does not include the physical downlink shared channel, and the one or more processors are individually or collectively further operable to execute the code to cause the network entity to:

refrain from transmitting the physical downlink shared channel via the semi-persistent scheduling occasion.

26. The network entity of claim 18, wherein the one or more processors are individually or collectively further operable to execute the code to cause the network entity to:

transmit the wake-up signal according to a periodicity that is based at least in part on a periodicity of the semi-persistent scheduling occasion.

27. The network entity of claim 18, wherein the control signaling further indicates a jitter range associated with the semi-persistent scheduling occasion, and transmitting the wake-up signal is in accordance with the jitter range associated with the semi-persistent scheduling occasion.

28. The network entity of claim 18, wherein bit values of one or more bits of the wake-up signal indicate whether the semi-persistent scheduling occasion includes the physical downlink shared channel.

29. A method for wireless communications at a user equipment (UE), comprising:

receiving, via a first radio at the UE, control signaling that indicates a configuration associated with a wake-up signal and that also indicates an association between the wake-up signal and a semi-persistent scheduling occasion;

monitoring, via a second radio at the UE, for the wake-up signal in accordance with the configuration; and performing one of a first procedure or a second procedure based at least in part on the monitoring, the first procedure pertaining to monitoring, via the first radio, the semi-persistent scheduling occasion, and the second procedure pertaining to maintaining the first radio of the UE in a sleep mode.

30. A method for wireless communications at a network entity comprising:

transmitting control signaling that indicates a configuration associated with a wake-up signal and that also indicates an association between the wake-up signal and a semi-persistent scheduling occasion; and transmitting the wake-up signal in accordance with the configuration, wherein the wake-up signal indicates to a user equipment (UE) whether the semi-persistent scheduling occasion includes a physical downlink shared channel.

* * * * *